US012780616B2

(12) United States Patent
Isringhausen et al.

(10) Patent No.: US 12,780,616 B2
(45) Date of Patent: *Nov. 3, 2026

(54) TANK CAR LIFTING APPARATUS

(71) Applicant: Cranemasters, Inc., North Chesterfield, VA (US)

(72) Inventors: Barry Isringhausen, Providence Forge, VA (US); Britt Calloway, Midlothian, VA (US); Jonathan Dip, Glen Allen, VA (US)

(73) Assignee: Cranemasters, Inc., North Chesterfield, VA (US)

( * ) Notice: Subject to any disclaimer, the term of this patent is extended or adjusted under 35 U.S.C. 154(b) by 81 days.

This patent is subject to a terminal disclaimer.

(21) Appl. No.: 18/083,689

(22) Filed: Dec. 19, 2022

(65) Prior Publication Data

US 2023/0192452 A1 Jun. 22, 2023

Related U.S. Application Data

(60) Continuation of application No. 17/739,438, filed on May 9, 2022, now Pat. No. 11,530,117, which is a continuation of application No. 16/802,278, filed on Feb. 26, 2020, now Pat. No. 11,325,814, which is a continuation of application No. 16/213,415, filed on Dec. 7, 2018, now Pat. No. 10,577,226, which is a division of application No. 15/409,269, filed on Jan. 18, 2017, now Pat. No. 10,150,651.

(51) Int. Cl.

| | |
|---|---|
| ***B66C 1/42*** | (2006.01) |
| ***B66C 1/44*** | (2006.01) |

(52) U.S. Cl.

CPC ................ *B66C 1/425* (2013.01); *B66C 1/44* (2013.01)

(58) Field of Classification Search

CPC ................................. B66C 1/425; B66C 1/44

See application file for complete search history.

(56) References Cited

U.S. PATENT DOCUMENTS

| | | | |
|---|---|---|---|
| D189,049 | S | 10/1960 | McElderberry |
| 3,602,375 | A | 8/1971 | Martinson |
| 3,627,372 | A | 12/1971 | Carpenter |
| 3,752,083 | A | 8/1973 | Bitterberg |
| 3,841,507 | A | 10/1974 | Barwise |
| 3,877,743 | A | 4/1975 | Johnson |
| 3,972,431 | A | 8/1976 | Fischer |
| 4,005,894 | A | 2/1977 | Tucek |
| 4,022,331 | A | 5/1977 | Bean et al. |
| 4,023,848 | A | 5/1977 | Bennett |
| 4,195,741 | A | 4/1980 | Newman |
| 4,223,612 | A | 9/1980 | Polley |
| 4,358,147 | A | 11/1982 | Hungerford |
| 4,407,203 | A | 10/1983 | Harbin et al. |

(Continued)

FOREIGN PATENT DOCUMENTS

| | | |
|---|---|---|
| DE | 20 2005 012 197 U1 | 10/2005 |
| GB | 224514 A | 9/1925 |
| YU | 12503 A | 9/2005 |

*Primary Examiner* — Stephen A Vu

(74) *Attorney, Agent, or Firm* — Sterne, Kessler, Goldstein & Fox P.L.L.C.

(57) ABSTRACT

A lifting apparatus for lifting a tank car is provided. The lifting apparatus can include a first arm to surround and not contact a tank car jacket and a second arm to surround and not contact the tank car jacket.

20 Claims, 20 Drawing Sheets

(56) References Cited

U.S. PATENT DOCUMENTS

| | | | |
|---|---|---|---|
| D272,827 S | | 2/1984 | Sapelak |
| 4,576,406 A | | 3/1986 | Johnson et al. |
| D306,599 S | | 3/1990 | Hunter |
| 5,076,173 A | | 12/1991 | Baker et al. |
| 5,163,804 A | | 11/1992 | Kobayashi |
| D332,271 S | | 1/1993 | DuBose et al. |
| 5,184,860 A | | 2/1993 | Bouillon et al. |
| 5,330,242 A | | 7/1994 | Lucky, Sr. |
| D354,605 S | | 1/1995 | Lucky, Sr. |
| 5,620,298 A | | 4/1997 | Barwise |
| 5,865,492 A | | 2/1999 | Horton |
| D408,609 S | | 4/1999 | Oja et al. |
| 5,890,754 A | | 4/1999 | Murr |
| 5,931,321 A | | 8/1999 | Grant |
| 6,168,219 B1 | | 1/2001 | Futa |
| 6,464,094 B2 | | 10/2002 | Zacharias |
| D496,945 S | | 10/2004 | Daniel |
| 7,004,697 B2 | | 2/2006 | Alaweih |
| 7,066,076 B2 | | 6/2006 | Roy et al. |
| 7,785,057 B2 | | 8/2010 | Noonan et al. |
| 7,963,230 B2 | | 6/2011 | Simpson et al. |
| D645,062 S | | 9/2011 | LaValley et al. |
| 8,156,720 B2 | | 4/2012 | Daraie et al. |
| D697,945 S | | 1/2014 | Healey et al. |
| D779,565 S | | 2/2017 | Jensen |
| 10,150,651 B2 | * | 12/2018 | Isringhausen ........... B66C 1/425 |
| 10,577,226 B2 | * | 3/2020 | Isringhausen ............. B66C 1/44 |
| D920,390 S | | 5/2021 | Johnson et al. |
| 11,325,814 B2 | * | 5/2022 | Isringhausen ............. B66C 1/44 |
| 11,530,117 B2 | * | 12/2022 | Isringhausen ............. B66C 1/44 |
| 2005/0100432 A1 | | 5/2005 | Mattson et al. |
| 2007/0130808 A1 | | 6/2007 | Peterson et al. |
| 2013/0069383 A1 | | 3/2013 | Sunde et al. |
| 2014/0028038 A1 | | 1/2014 | LaValley et al. |
| 2019/0382244 A1 | | 12/2019 | Hawkes |

* cited by examiner

TANK CAR LIFTING APPARATUS

CROSS REFERENCE TO RELATED APPLICATIONS

This application is a continuation of U.S. application Ser. No. 17/739,438, filed May 9, 2022, which is a continuation of U.S. application Ser. No. 16/802,278, filed Feb. 26, 2020, now issued as U.S. Pat. No. 11,325,814, which is a continuation of U.S. application Ser. No. 16/213,415, filed Dec. 7, 2018, now issued as U.S. Pat. No. 10,577,226, which is a divisional of U.S. application Ser. No. 15/409,269, filed Jan. 18, 2017, now issued as U.S. Pat. No. 10,150,651, each of which are incorporated herein by reference in their entireties.

FIELD

Embodiments of the present invention relate to a method and apparatus for lifting a tank car.

BACKGROUND

In the railroad derailment recovery industry, companies are charged different rates based on the lifting capacity of the crane or other machine(s) needed to lift a tank car, and other unique equipment used to help recover from derailments. The rigging attaches the tank car to the crane. The rigging adds to the total weight to be lifted by the crane and thus reduces a crane's net lifting capacity. It is therefore advantageous to utilize as low weight a rigging as possible to maximize the lifting efficiency of the crane, e.g., the lifting capacity of the crane as compared to the weight of the rigging.

Railroad tank cars must be lifted for maintenance and after a derailment. However, railroad tank cars can be a challenge to lift by conventional means. The sides of the tank car jacket extend beyond the sides of the tank car bolster lifting lugs. The tank car lift lugs on the tank car bolster are therefore difficult to access to lift the tank car vertically. One option to lift the tank car without contacting the tank car jacket is to suspend a large beam from a crane and attach the tank car lugs to the beam with chains. In this manner, the chains and rigging used to lift the tank car must be kept at a steep angle outward from the lift lugs to avoid contacting and damaging the tank car jacket. This approach could damage the tank car bolster by the high lateral forces imposed by the steep angle of rigging. In addition, a beam and rigging with the requisite strength would be very heavy and would reduce the lifting efficiency of the crane. This approach also leads to an unstable loading condition of the crane because the lifting location on the tank car is lower than the tank car's center of gravity.

A second option is to surround the tank car jacket with chains or other rigging and lift the tank car upward by the rigging. But because of the position of the lifting lugs on tank cars, the rigging presses onto the tank car jacket and often damages the tank car jacket. The tank car damage causes significant additional costs for repair and may even cause the car to be taken out-of-service. Thick metal plates, known as tank car shields, can also be positioned adjacent to the tank car jacket to act as a barrier from the rigging. However, tank car shields can be ineffective and often still result in damage to the tank car jacket. Tank car shields are also dangerous and time consuming to install and could lead to injury during installation, use, or removal. In addition, current methods for lifting a tank car require two cranes or lifting machines on each side of the car for each end lifted.

BRIEF SUMMARY OF THE INVENTION

One aspect of the invention provides a tank car lifting apparatus that can lift an end of a tank car without damaging the car or its jacket using a single crane. The tank car lifting apparatus can lift the tank car from multiple positions, including a tank car positioned leaning significantly to one side due to derailment. The tank car lifting apparatus can also lift the tank car without having to first drain the tank car, which can save time and money. The arms of the tank car lifting apparatus can be foldable for storage of the tank car lifting apparatus. The tank car lifting apparatus can include an integrated storage rack attached to the tank car lifting apparatus. The storage rack can include foldable legs that can be pinned to the tank car lifting apparatus for storage or can be extended to allow the tank car lifting apparatus to be transported and stored on the rack.

In an aspect of the invention, a lifting apparatus for lifting a tank car can include a beam to attach to a crane, a first arm having a first end rotatably connected to a first end of the beam and a second end to attach to and lift the tank car, a second arm having a first end rotatably connected to a second end of the beam and a second end to attach to and lift the tank car, and a synchronizing linkage to synchronize movement of the first arm and the second arm. The lifting apparatus can include a winch hole in the first arm for attachment to a winch, other device, or other machine to move the first arm between an open position and a closed position. The first arm can be curved along its length and can be adapted to extend around a first side of the tank car. In another aspect, the second arm can be curved along its length and can be adapted to extend around a second side of the tank car. In an aspect, the second end of the first arm can be connected to a tank car bolster lug. The second end of the first arm can be pinned to a platform lug of the tank car. In a further aspect, a first arm attachment can be rotatably connected to the second end of the first arm and the first arm attachment can abut a tank car bolster jack pad to lift the tank car. The lifting apparatus can include a first appendage fixed to the first arm, a second appendage fixed to the second arm, and the synchronizing linkage can be connected to the first appendage and the second appendage to synchronize movement of the first arm and the second arm. The synchronizing linkage can be a diagonal link connected to the first appendage by a first bearing and the second appendage by a second bearing. At least one of the first bearing and the second bearing can be a spherical bearing. In another aspect, the synchronizing linkage can include at least one of a gear, a cable system, a double rod piston, a clutch, a ratchet and pawl, a chain and binder, a wedge, and an articulating arm. Synchronization is essential for the operation of the tank car lifting apparatus. Movement of the arms is synchronized such that the first arm and the second arm open and close at the same time. Connection of the ends of the first arm and the second arm to the tank car bolster changes the movable first arm and second arm, beam, and synchronizing linkage into a rigid frame. The lifting apparatus lifts the tank car as a rigid frame from below the tank car's center of gravity. The lifting apparatus rigid frame allows the tank car to hang "plumb" from the crane hook.

In a further aspect of the invention, a lifting apparatus for lifting a tank car having a cylindrical tank can include a beam to attach to a crane, a first arm having a first end rotatably connected to a first end of the beam by a pin connection and a second end to attach to the tank car, a second arm having a first end rotatably connected to a second end of the beam by a pin connection and a second end to attach to the tank car, and a synchronizing linkage to synchronize movement of the first arm and the second arm, the synchronizing linkage having a first end connected to the first arm and a second end connected to the second arm. The lifting apparatus can have a lifting position and a storage position. In the lifting position, the first arm and the second arm can extend substantially perpendicular to the beam, and in the storage position, the first arm and the second arm can extend substantially parallel to the beam. The lifting apparatus can include a first storage leg attached to the first end of the synchronizing linkage and a second storage leg attached to the second end of the synchronizing linkage. The first storage leg and the second storage leg can support the weight of the lifting apparatus in the storage position. The lifting apparatus can also include a second synchronizing linkage to synchronize movement of the first arm and the second arm. The second synchronizing linkage can have a first end connected to the first arm and a second end connected to the second arm. The second synchronizing linkage can be positioned on an opposite side of the beam with respect to the synchronizing linkage. The second synchronizing linkage can be parallel to the synchronizing linkage. The lifting apparatus can include a third storage leg attached to the first end of the second synchronizing linkage and a fourth storage leg attached to the second end of the second synchronizing linkage. The first storage leg, second storage leg, third storage leg, and fourth storage leg can support the weight of the lifting apparatus in the storage position.

In another aspect, a method for lifting a tank car having a cylindrical tank can include positioning a lifting apparatus above a tank car. The lifting apparatus can include a beam to attach to a crane, a first arm having a first end rotatably connected to a first end of the beam and a second end to attach to the tank car, a second arm having a first end rotatably connected to a second end of the beam and a second end to attach to the tank car, and a synchronizing linkage to synchronize movement of the first arm and the second arm. The method can also include pulling at least one of the first arm and the second arm open using a winch, lowering the opened lifting apparatus to surround the cylindrical tank, connecting the second end of the first arm to a first tank car support, connecting the second end of the second arm to a second tank car support, and raising the lifting apparatus to lift the tank car. The tank car can include a chassis, and prior to raising the lifting apparatus to lift the tank car, the chassis can have an angle with respect to a horizon of approximately 25 degrees. In another aspect, prior to raising the lifting apparatus to lift the tank car, the chassis can have an angle with respect to a horizon ranging from approximately five degrees to approximately 25 degrees. In a further aspect, prior to raising the lifting apparatus to lift the tank car, the chassis can have an angle with respect to a horizon of greater than approximately 25 degrees. In another aspect, the method can include disconnecting the tank car from the first arm and the second arm, folding the first arm and the second arm by moving the second end of the first arm and the second end of the second arm upward, and storing the lifting apparatus on a storage rack, the storage rack having a plurality of legs connected to the synchronizing linkage.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 16:
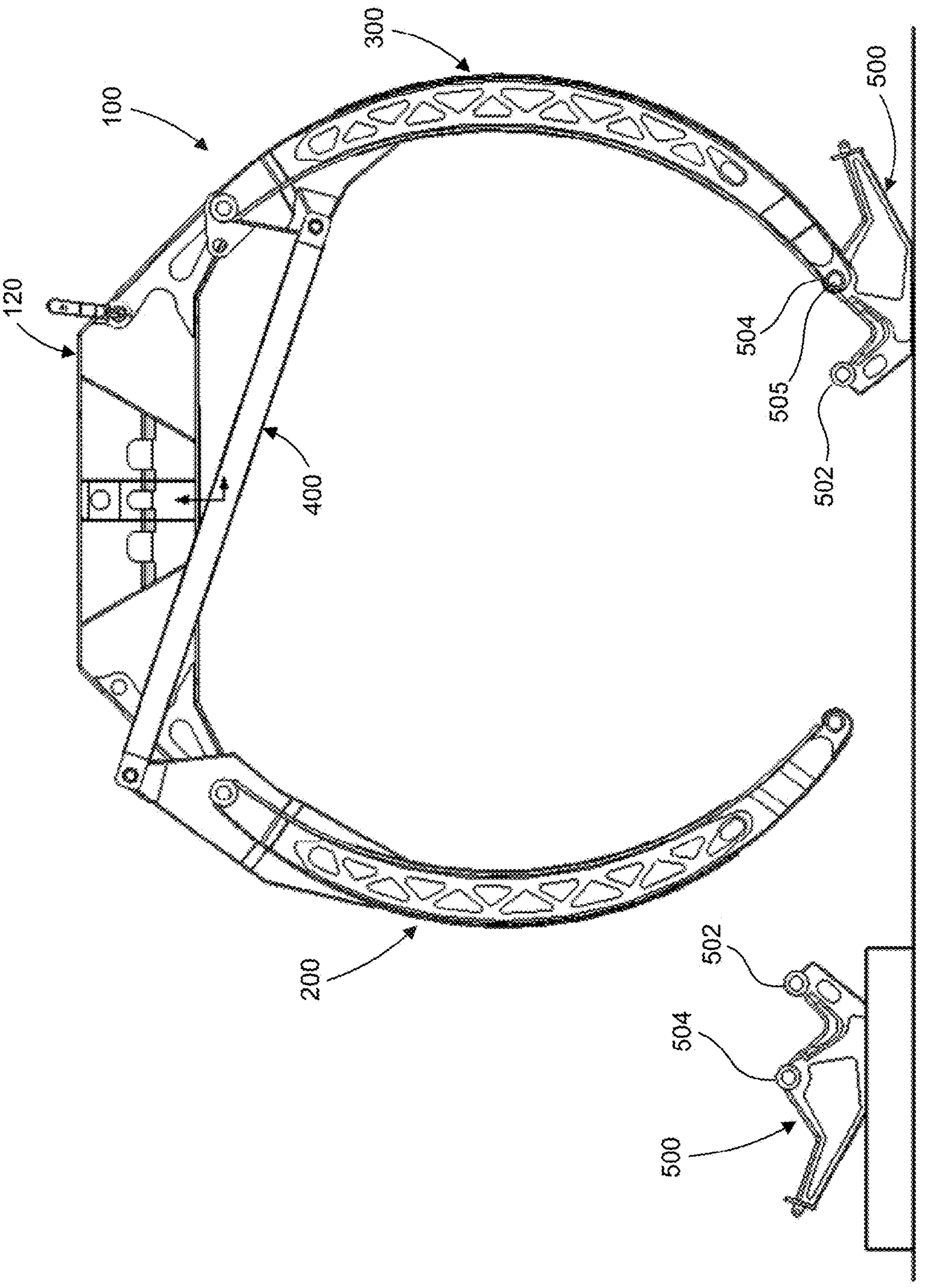

FIG. 16 the front view of a tank car lifting apparatus with arm attachments according to various aspects of the invention.

Figure 17:
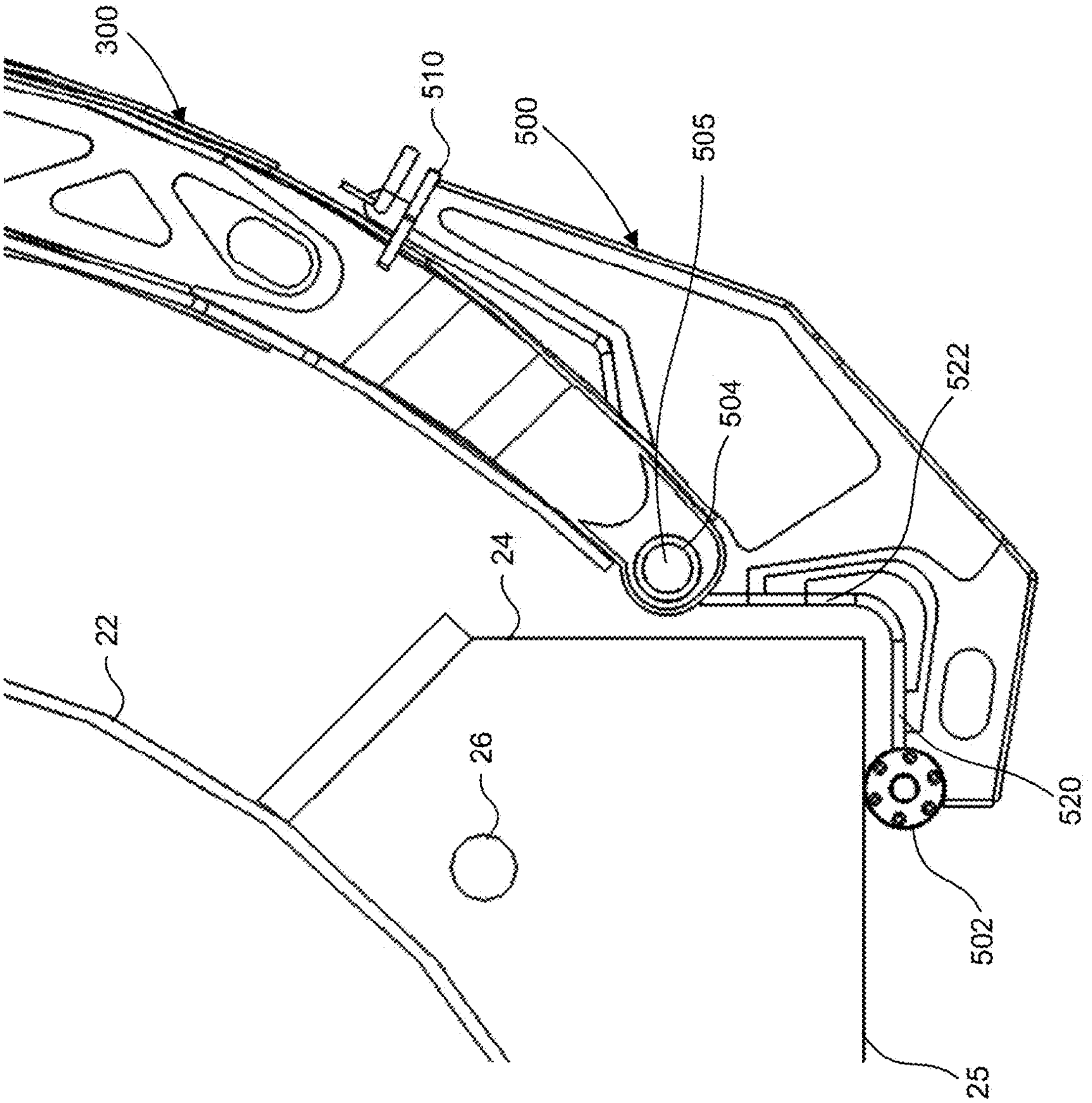

FIG. 17 is a partial front view of a tank car lifting apparatus arm attachment according to various aspects of the invention.

Figure 18:
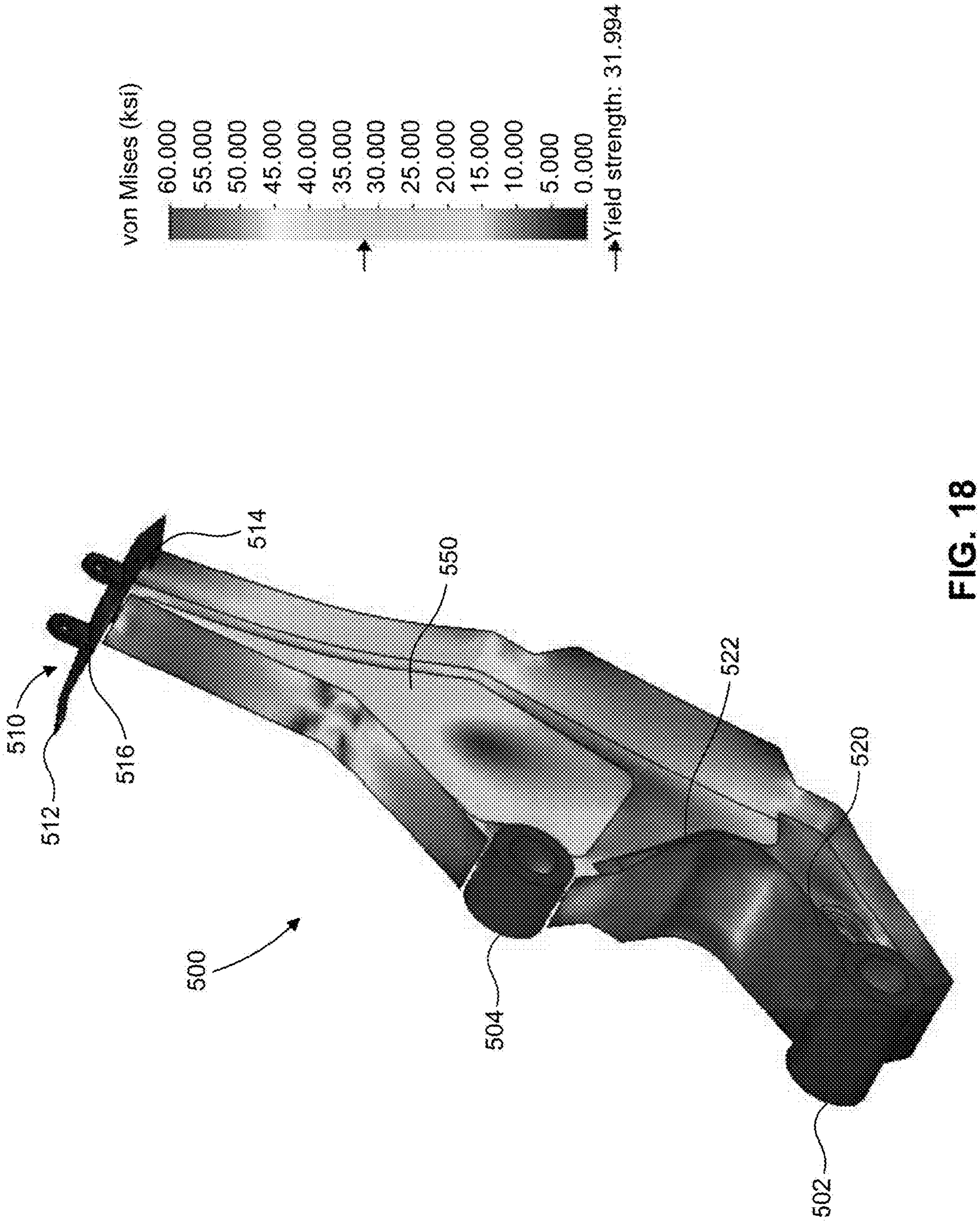

FIG. 18 is a perspective view of a tank car lifting apparatus arm attachment showing a prediction of surface von Mises stress (ksi) in the tank car lifting apparatus arm attachment.

Features and advantages of the embodiments will become more apparent from the detailed description set forth below when taken in conjunction with the drawings, in which like reference characters identify corresponding elements throughout.

DETAILED DESCRIPTION OF THE INVENTION

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
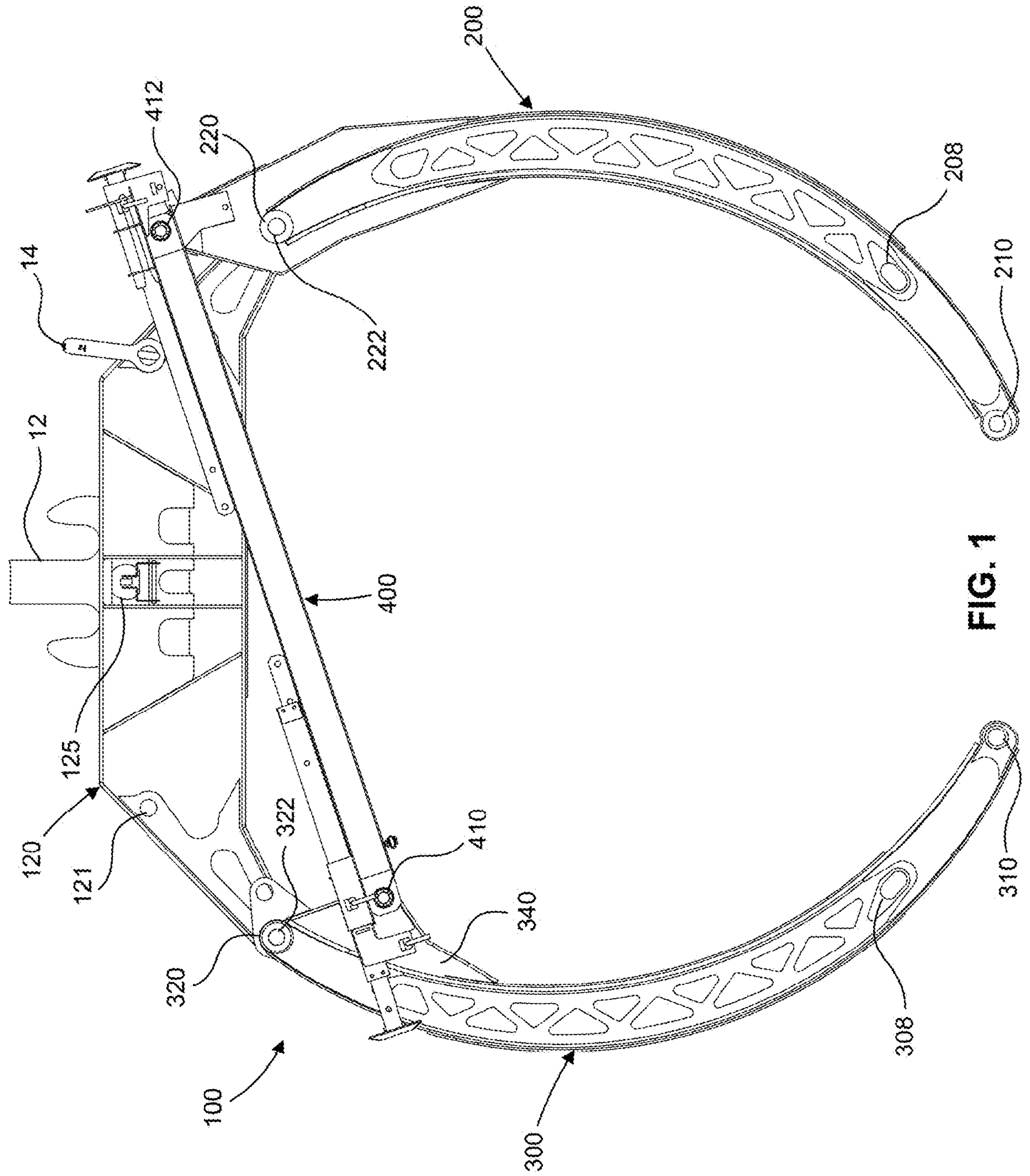
FIG. 1 is a front view of a tank car lifting apparatus according to various aspects of the invention.
Figure 2:
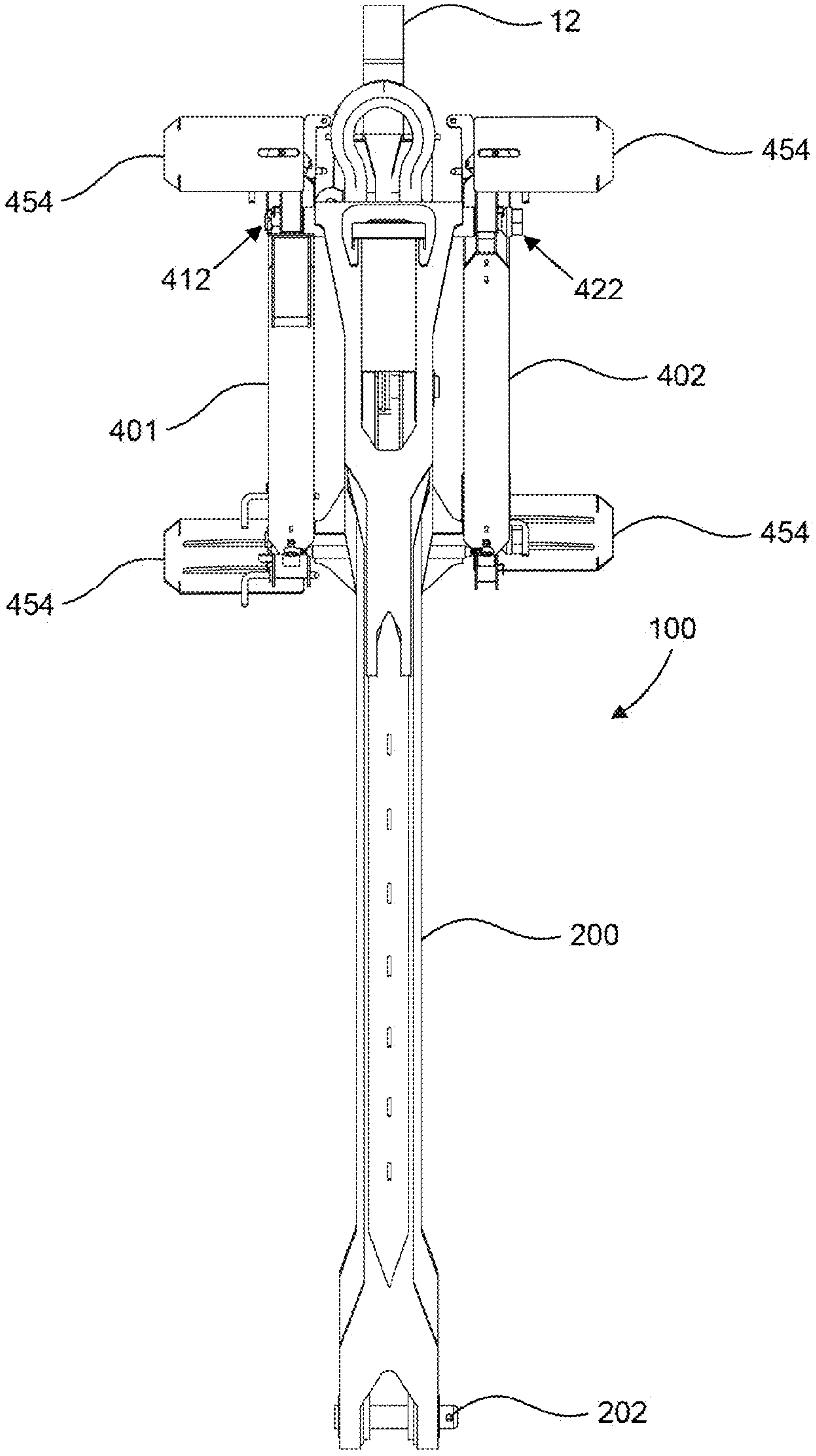
FIG. 2 is a side view of a tank car lifting apparatus according to various aspects of the invention.
Figure 3:
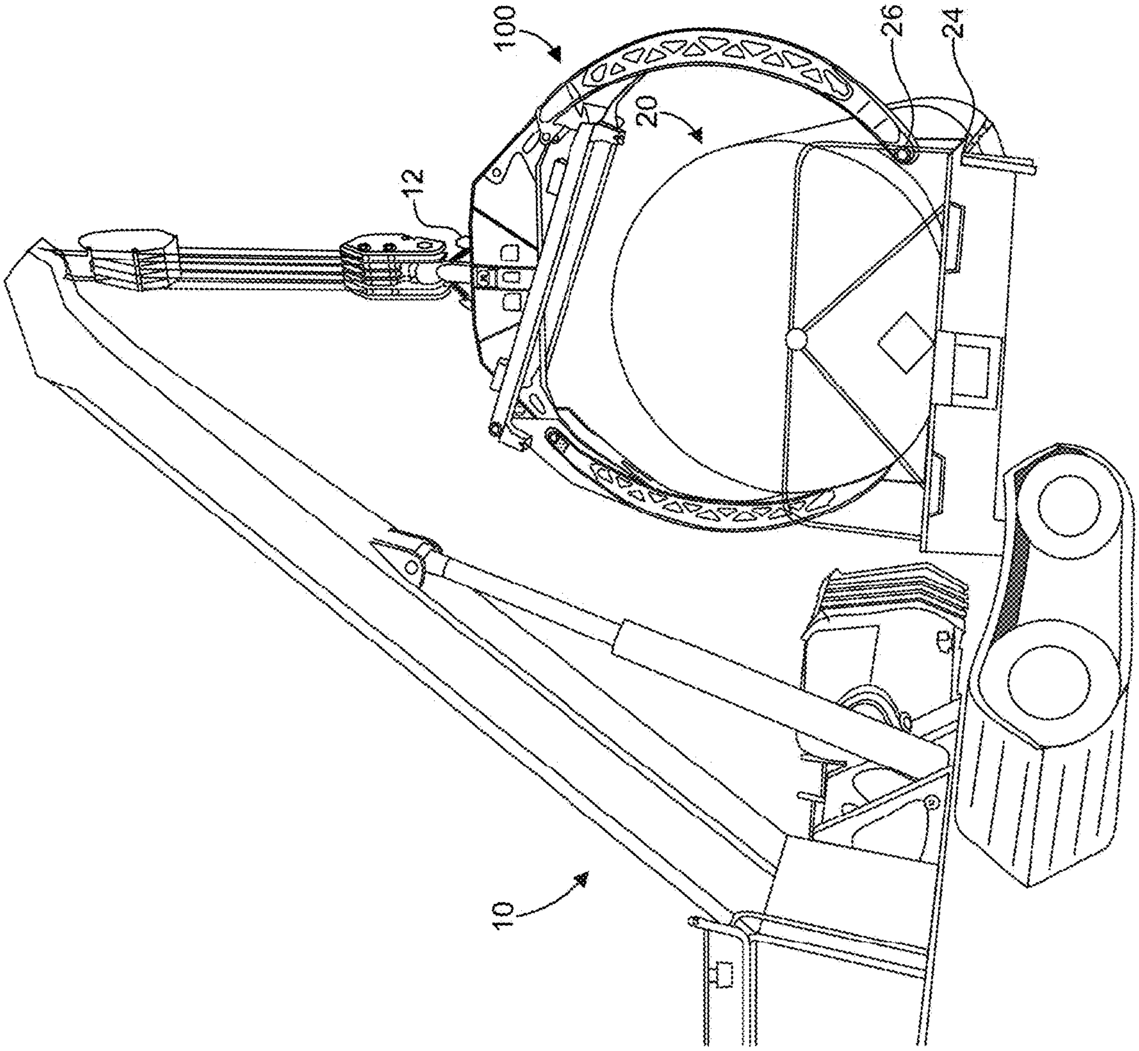
FIG. 3 is a perspective view of a crane, tank car lifting apparatus, and lifted tank car according to various aspects of the invention.

Tank car lifting apparatus 100 is shown in FIGS. 1-3. Tank car lifting apparatus 100 can include spreader beam 120, an upper arm 200, a lower arm 300, and synchronizing linkage 400. Synchronizing linkage 400 synchronizes the movement of upper arm 200 and lower arm 300 with respect to spreader beam 120 such that upper arm 200 and lower arm 300 move at the same time, as described further below. For example, movement of upper arm 200 causes simultaneous movement of lower arm 300 due to synchronizing linkage 400. As used herein, synchronizing linkage means a structural connection between upper arm 200 and lower arm 300. The synchronizing linkage can include a beam, hydraulics, a gear, a cable system, a double rod piston, a clutch, a ratchet and pawl, a chain and binder, a wedge, and/or an articulating arm.

In an aspect, tank car lifting apparatus 100 can be attached to a crane 10 (FIG. 3) via crane hook 12. The I-beam structure of spreader beam 120 and the curved shape and reinforced I-beam structure of upper arm 200 and lower arm 300, maximize the lifting efficiency of the crane 10 for lifting tank car 20 without damaging the tank car jacket 22. For example, the weight of tank car lifting apparatus 100 can range from approximately 4,000 lbs. to approximately 10,000 lbs., such as approximately 4,000 lbs. to approximately 6,000 lbs., such as approximately 4,700 lbs. The weight of tank car lifting apparatus 100 can be less than approximately 10,000 lbs. The lifting capacity of tank car lifting apparatus 100 can be greater than approximately 50 tons, such as greater than approximately 60 tons, such as greater than approximately 70 tons, such as greater than approximately 80 tons, such as greater than or equal to approximately 90 tons. The lifting capacity of tank car lifting apparatus 100 is sufficient to withstand a load shift of tank car 20 or for use with tank car 20 that is "dug in" to earth. The lifting capacity of crane 10 can be greater than or equal to approximately 100 tons. The typical maximum tank car weight is approximately 263,000 lbs. In an aspect, tank car lifting apparatus 100 can be positioned at one end of tank car 20, and a second crane can lift tank car 20 at its other end by the coupler. Use of tank car lifting apparatus 100 with the second crane at the other end of tank car 20 provides a three point support of tank car 20. Three points of support is the minimum needed to lift tank car 20 from below its center of gravity.

Crane hook 12 can be positioned within spreader beam 120 and can be pinned or otherwise detachably attached to spreader beam 120 through crane pin hole 125. The pin connection to crane hook 12 in the middle of spreader beam 120 allows spreader beam 120 to rotate relative to crane hook 12 about the connecting pin. In another aspect, spreader beam 120 can include a crane shackle 14 and a shackle hole 121. A the end of tank car 20, a first crane can be attached to tank car lifting apparatus 100 at crane shackle 14 and a second crane can be attached to tank car lifting apparatus 100 at shackle hole 121 to perform a tandem crane lift of the tank car.

Figure 4:
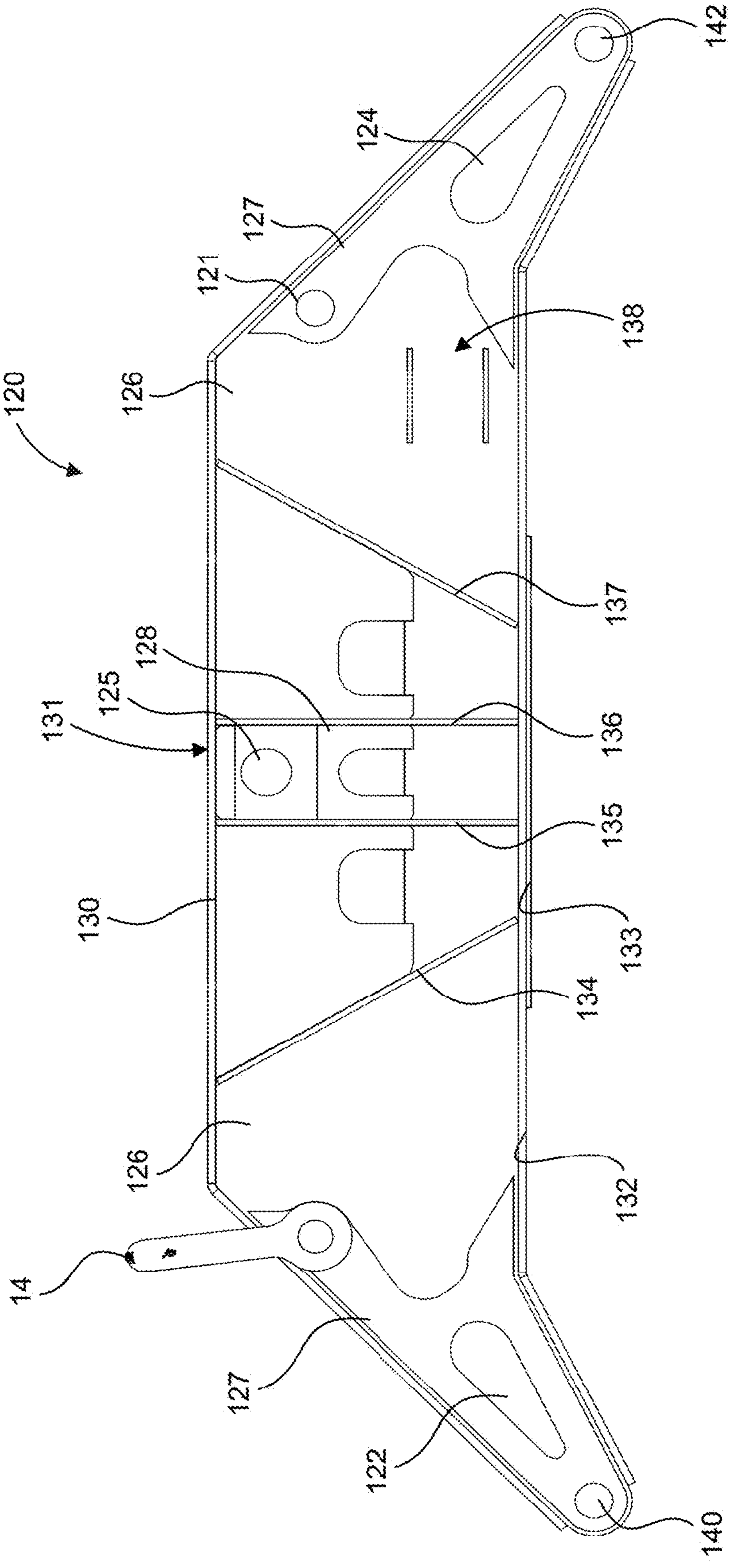
FIG. 4 is a front view of a tank car lifting apparatus spreader beam according to various aspects of the invention.
Figure 5:
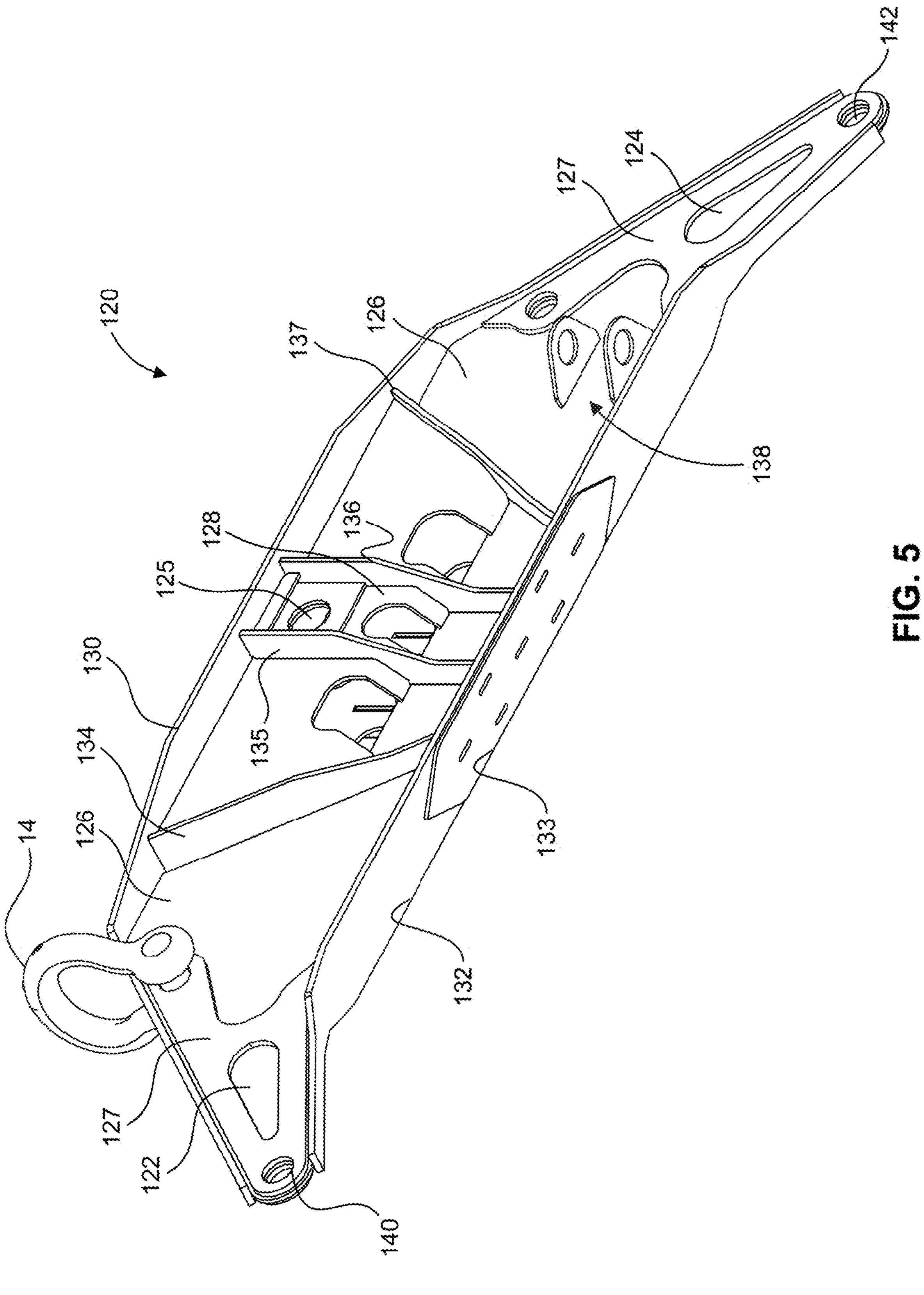
FIG. 5 is a perspective view of a tank car lifting apparatus spreader beam according to various aspects of the invention.

As shown in FIGS. 4-5, spreader beam 120 can include a top flange 130, a top flange doubler 131, a bottom flange 132, and a bottom flange doubler 133. Top flange 130 and bottom flange 132 can be connected to web 126. Spreader beam 120 can also include endplates 134 and 137 and mid-plates 135 and 136. Spreader beam 120 can include a web doubler 127 adjacent lower arm bearing 140 and/or upper arm bearing 142. In an aspect, lower arm bearing 140 and/or upper arm bearing 142 can be a bushing. Spreader beam 120 can be connected to lower arm 300 through lower arm bearing 140. Spreader beam 120 can also be connected to upper arm 200 through upper arm bearing 142. Spreader beam 120 can also include fold hole 122 and fold hole 124 to reduce the weight of spreader beam 120. In an aspect, spreader beam 120 can be made from steel, for example, A514 steel.

Figure 6:
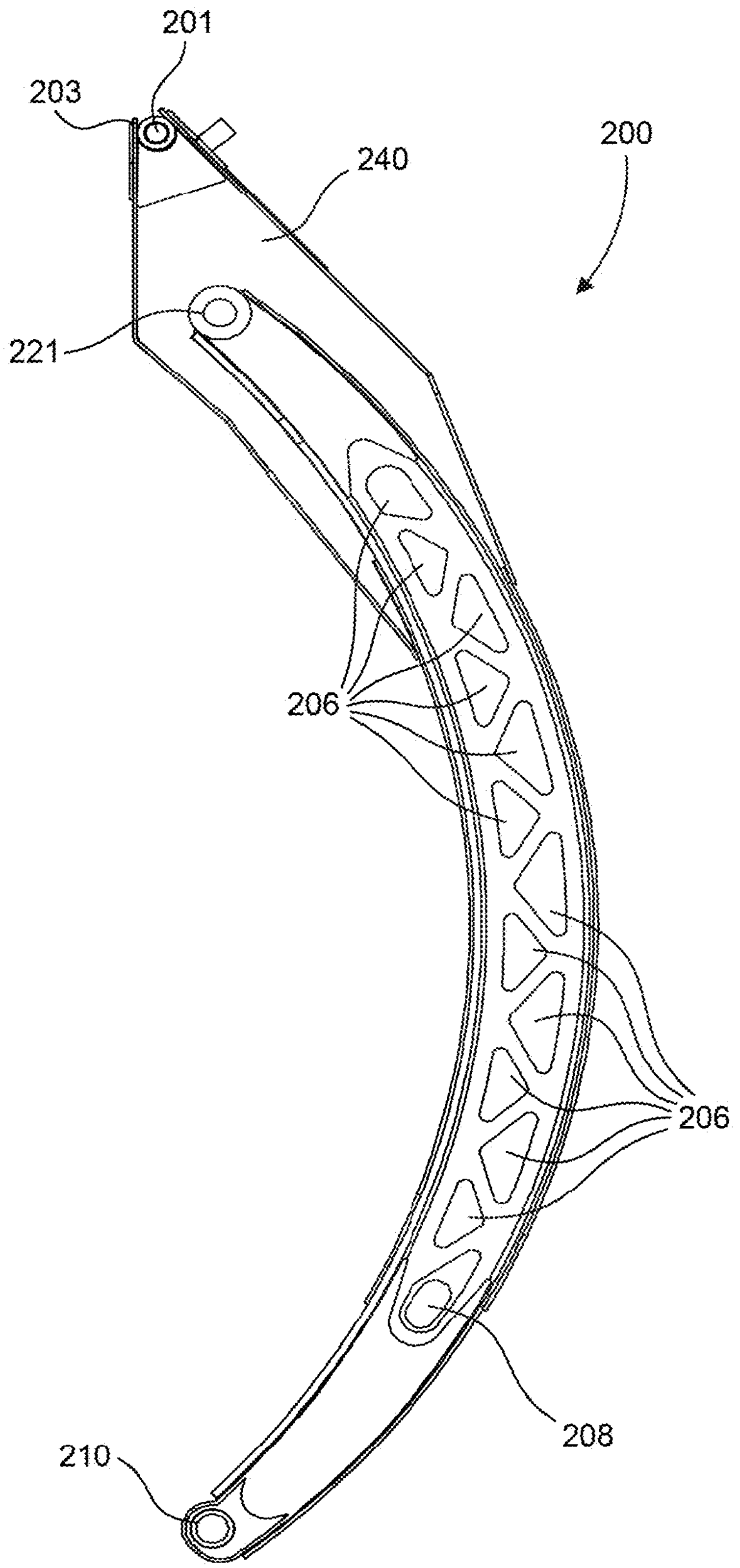
FIG. 6 is a front view of a tank car lifting apparatus upper arm according to various aspects of the invention.
Figure 7B:
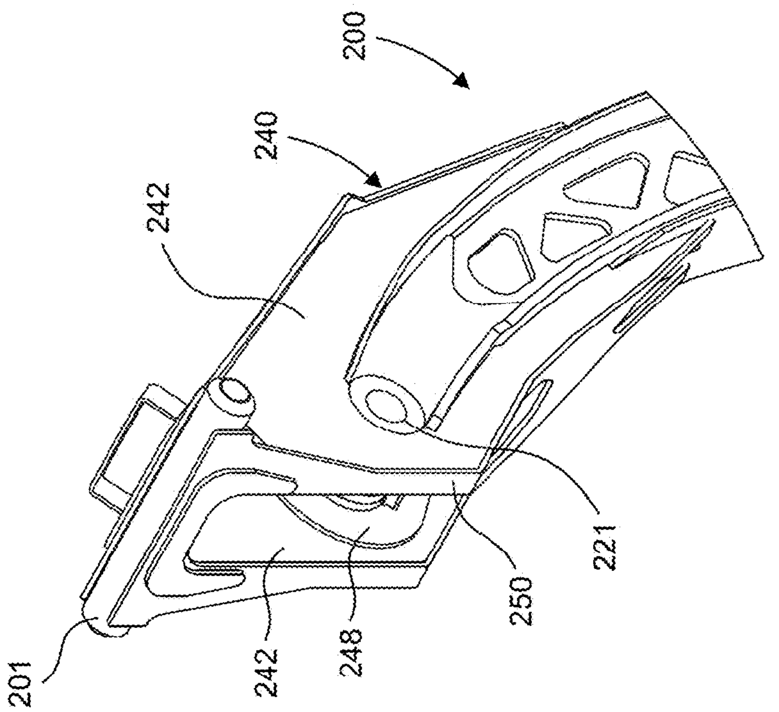
FIGS. 7A-7B show partial perspective views of an upper end of a tank car lifting apparatus upper arm according to various aspects of the invention.
Figure 7A:
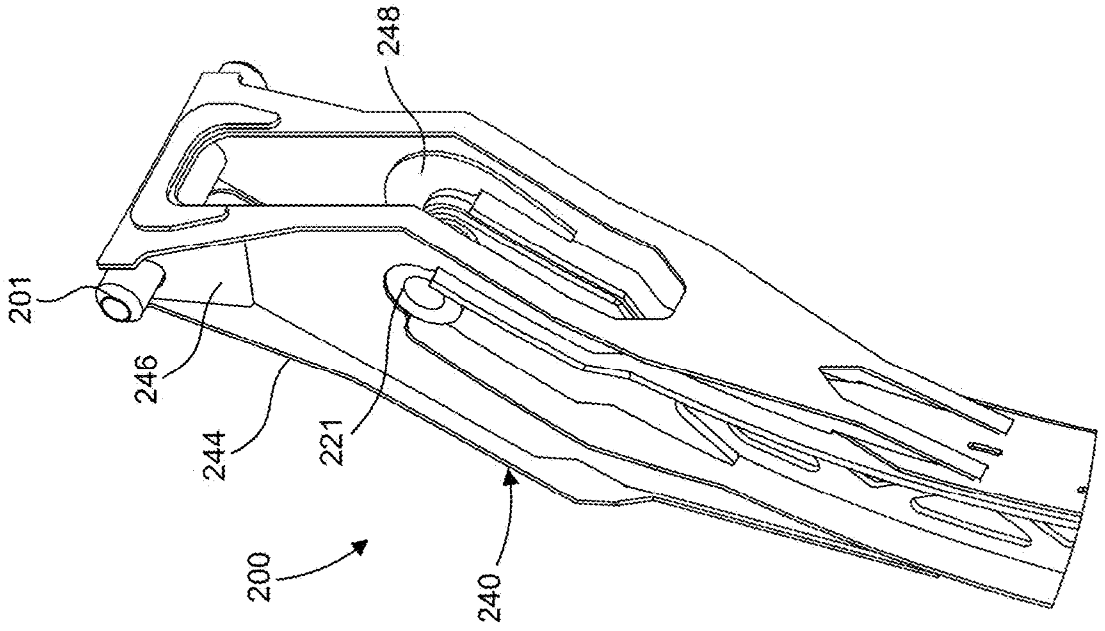
Figure 8:
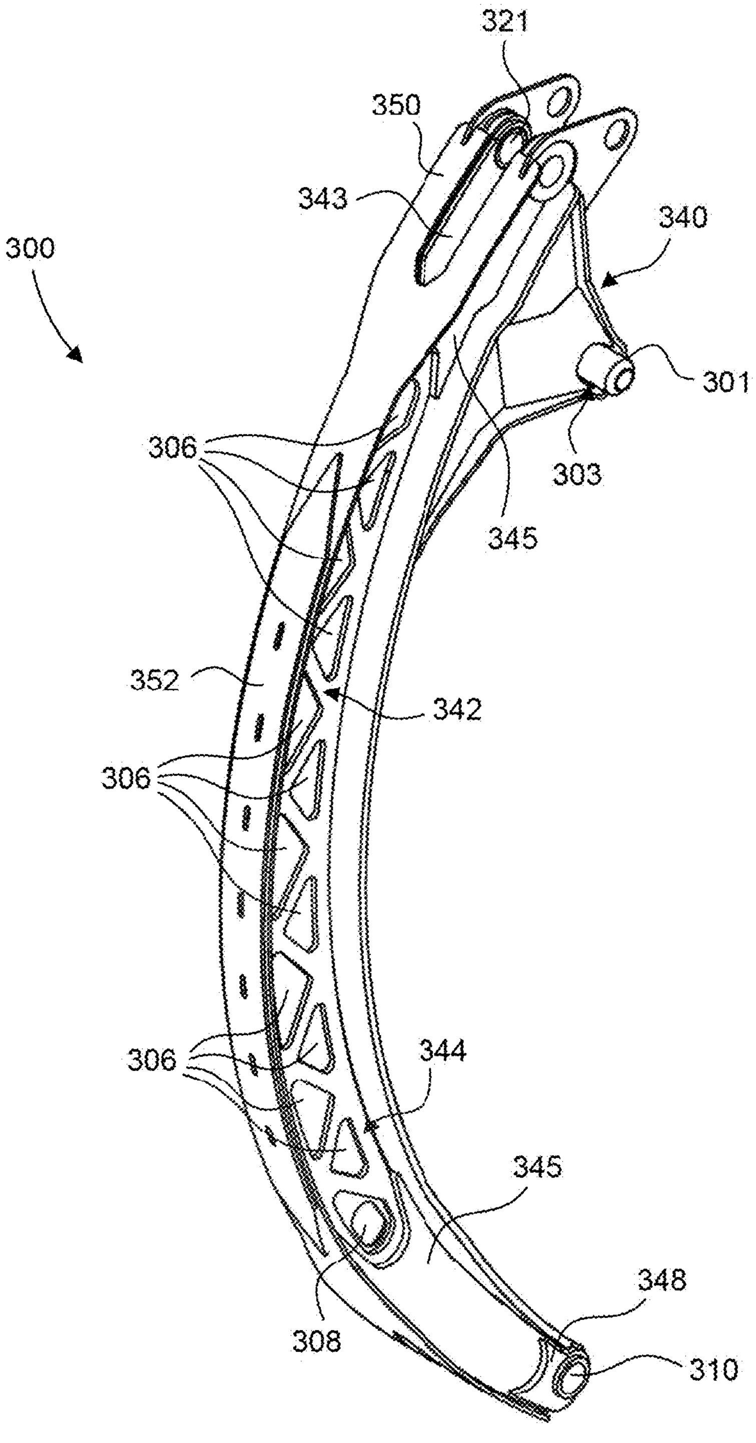
FIG. 8 is a perspective view of a tank car lifting apparatus lower arm according to various aspects of the invention.
Figure 9:
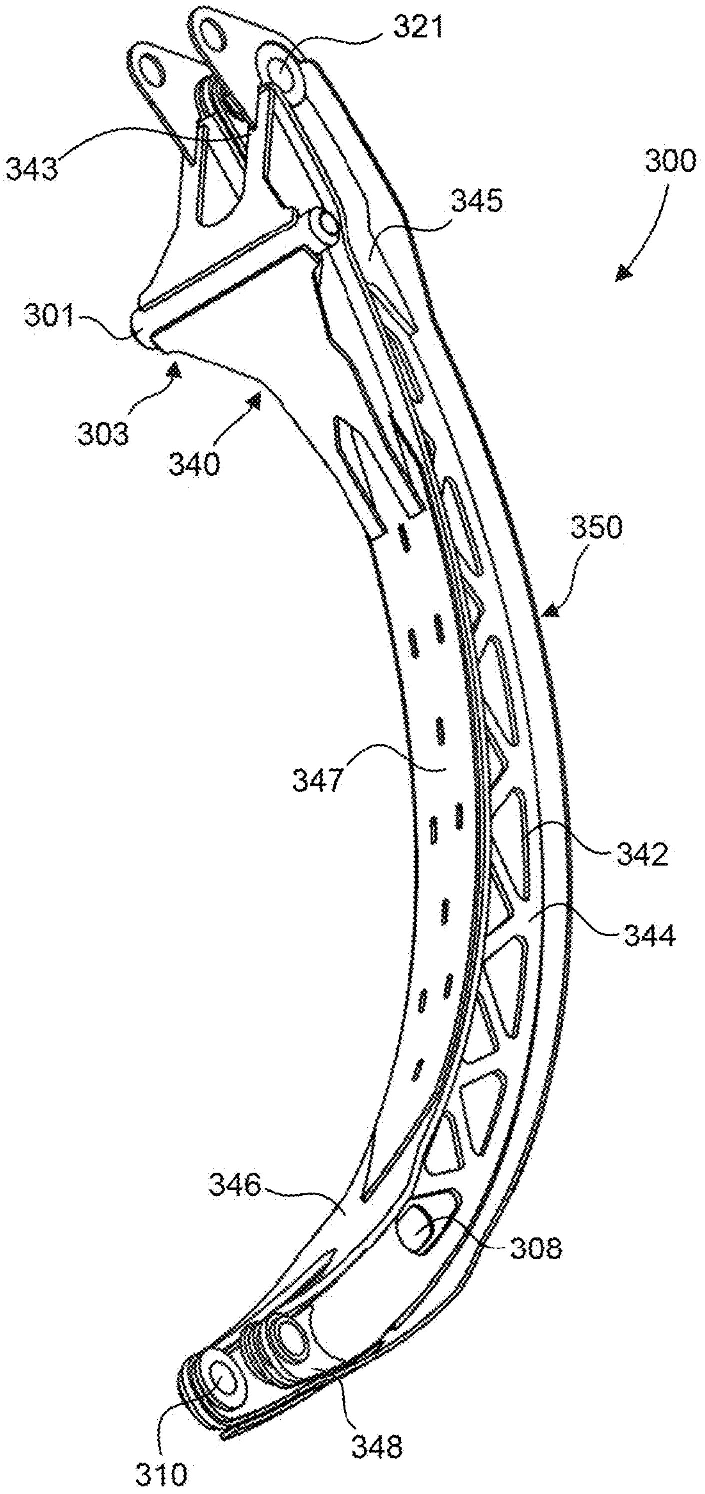
FIG. 9 is a perspective view of a tank car lifting apparatus lower arm according to various aspects of the invention.

As shown in FIGS. 6-7B, upper arm 200 can include a bearing 203 positioned on upper arm connection appendage 240. In an aspect, bearing 203 can be a bushing. Upper arm 200 can be connected to synchronizing linkage 400 through bearing 203. Upper arm 200 can also include pin bearing 221 and lower bearing 210. In an aspect, pin bearing 221 and/or lower bearing 210 can be a bushing. Upper arm 200 can be connected to spreader beam 120 through pin bearing 221. Upper arm 200 can be connected to a tank car bolster through lower bearing 210. Upper arm 200 can also include a plurality of lightening holes 206 positioned along its length. Upper arm connection appendage 240 can include a top pin 242, a rear flange 244, a diaphragm 246, a top doubler 248, and an IR flange 50. Top doubler 248 can be positioned adjacent pin bearing 221. In an aspect, upper arm 200 can be made from steel, for example, A514 steel As shown in FIGS. 8-9, lower arm 300 can include a bearing 303 positioned on lower arm connection appendage 340. In an aspect, bearing 303 can be a bushing. Lower arm 300 can be connected to a synchronizing linkage 400 through bearing 303. Lower arm 300 can also include bearing 321 and lower bearing 310. In an aspect, bearing 321 and/or lower bearing 310 can be a bushing. Lower arm 300 can be connected to spreader beam 120 through bearing 321. Lower arm 300 can be connected to a tank car bolster through lower bearing 310. Lower arm 300 can also include a plurality of lightening holes 306 positioned along its length. Lower arm 300 can include a center web 342, a center web doubler 343, an outer web 344, an outer web doubler 345, an inner flange 346, an inner flange doubler 347, a lower doubler 348, an outer flange 350, and an outer flange doubler 352. In an aspect, lower arm 300 can be made from steel, for example, A514 steel Upper arm 200 and lower arm 300 can be curved along their length. For example, the radius of curvature of upper arm 200 and/or lower arm 300 can range from approximately 50 inches to approximately 120 inches, such as approximately 60 inches to approximately 110 inches, such as approximately 70 inches to approximately 100 inches; such as approximately 80 inches to approximately 90 inches. The curvature of upper arm 200 and lower arm 300 allows for a compact and lighter weight spreader beam 120. Due to their curvature, upper arm 200 and lower arm 300 extend around the tank car jacket to reach the inwardly positioned lifting lugs and avoid contact and subsequent damage to the tank car jacket commonly seen when chains and/or cables are used to lift tank cars.

Referring to FIGS. 1-3, upper arm 200 can be connected to spreader beam 120 at upper connection 220. Upper connection 220 can be a pin connection to rotatably fix upper arm 300 to spreader beam 120. For example, upper connection 220 can include a pin 222 that extends through pin bearing 221 on upper arm 200 and upper arm bearing 142 on spreader beam 120. Lower arm 300 can be connected to spreader beam 120 at lower connection 320. Lower connection 320 can be a pin connection to rotatably fix lower arm 300 to spreader beam 120. For example, lower connection 320 can include a pin 322 that extends through bearing 321 on lower arm 300 and lower arm bearing 140 on spreader beam 120. In an aspect, upper connection 220 can have radial play between pin 222, upper arm bearing 142, and pin bearing 221 such that upper connection 220 can function as a spherical bearing. For example, upper connection 220 can have approximately ½ inch to approximately 1 inch of radial play between pin 222, upper arm bearing 142, and pin bearing 221. In another aspect, lower connection 320 can have radial play between lower arm bearing 140, pin 322, and bearing 321 such that lower connection 320 can function as a spherical bearing. For example, lower connection 320 can have approximately ½ inch to approximately 1 inch of radial play between pin 322, lower arm bearing 140, and bearing 321.

Figure 12:
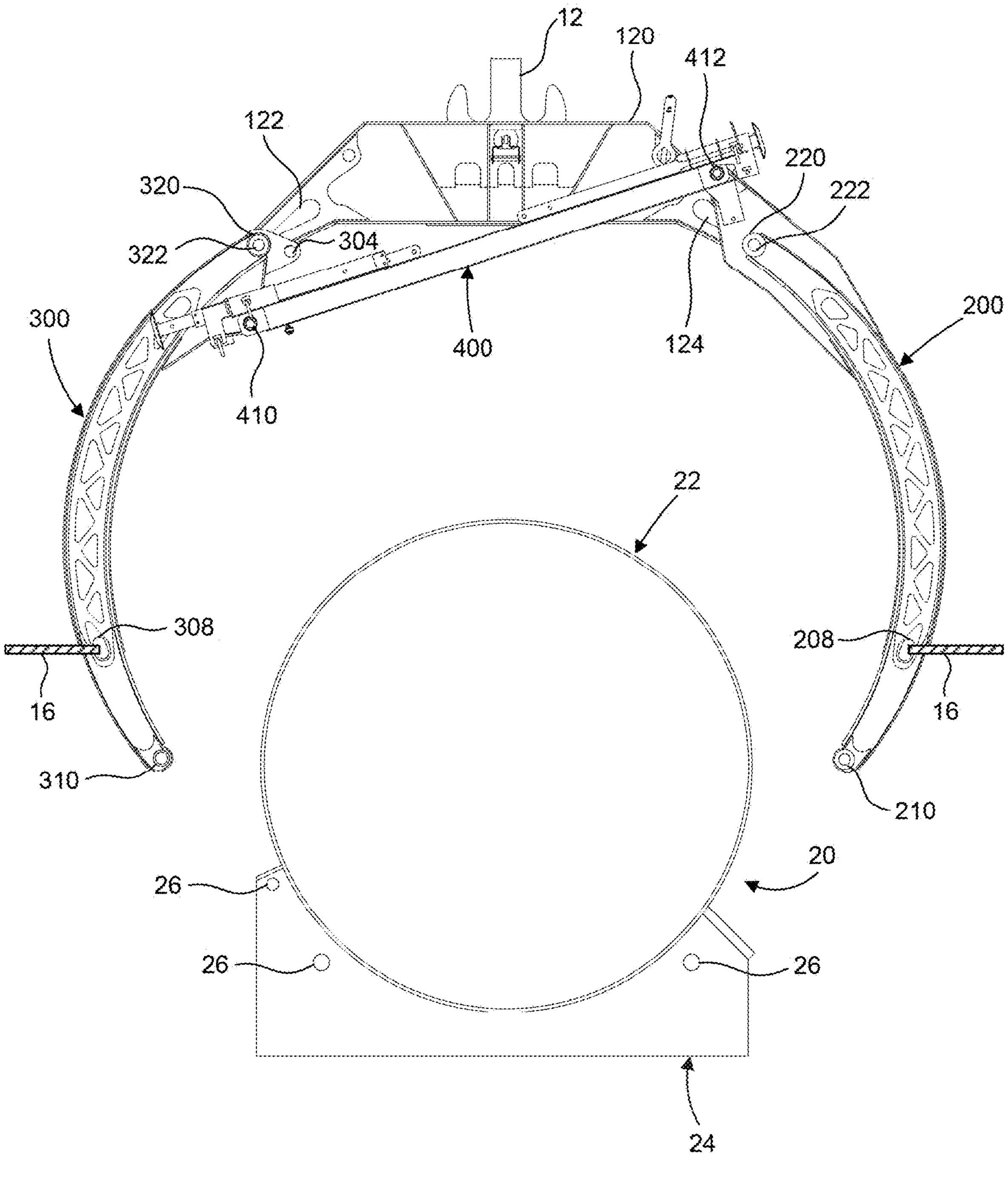
FIG. 12 is a front view of a tank car lifting apparatus and tank car according to various aspects of the invention.

In an aspect, tank car lifting apparatus 100 is not self-powered. Upper arm 200 can include a winch hole 208 and lower arm 300 can include a winch hole 308. In an aspect, winch hole 208 can be positioned on an exterior or interior surface of upper arm 200. In another aspect, winch hole 308 can be positioned on an exterior or interior surface of lower arm 300. One or more winches can be attached to the winch holes 208 and 308 via winch lines 16. The winches can change the positions of upper arm 200 and lower arm 300 with respect to spreader beam 120 by retracting and extending winch lines 16 (FIG. 12). For example, the winches can extend winch lines 16 to move the lower ends of upper arm 200 and lower arm 300 towards each other to close tank car lifting apparatus 100. The winches can retract winch lines 16 to move the lower ends of upper arm 200 and lower arm 300 away from each other to open tank car lifting apparatus 100.

Synchronizing linkage 400 can connect upper arm 200 to lower arm 300 to synchronize movement between upper arm 200 and lower arm 300 such that upper arm 200 and lower arm 300 move at the same time. Synchronizing linkage 400 can connect to upper arm 200 via bearing 412. Synchronizing linkage 400 can connect to lower arm 300 via bearing 410. A vertical position of bearing 412 can be above a vertical position of bearing 410. In an aspect, bearing 412 can have a vertical position above upper connection 220. Bearing 410 can have a vertical position below lower connection 320. Synchronizing linkage 400 can allow upper arm 200 and lower arm 300 of tank car lifting apparatus 100 to be adjustable to accommodate various tank car angles with respect to horizon, as discussed below with respect to FIGS. 12-14C. For example, tank car lifting apparatus 100 can lift a tank car angled at approximately 25 degrees with respect to the horizon.

Synchronizing linkage 400 can permit adjustment of upper arm 200 and lower arm 300 when lower bearing 210 and lower bearing 310 at the lower ends of the arms are not attached to a tank car bolster. Synchronizing linkage 400 can also prevent movement of upper arm 200 and lower arm 300 when lower bearing 210 and lower busing 310 at the lower ends of the arms are attached to and/or connected to a tank car bolster for lifting.

In an aspect, a single synchronizing linkage can be used to connect upper arm 200 to lower arm 300.

In another aspect, synchronizing linkage 400 can include a first synchronizing linkage 401 to connect upper arm 200 to lower arm 300 across a first side of spreader beam 120. Synchronizing linkage 400 can also include a second synchronizing linkage 402 to connect upper arm 200 to lower arm 300 across a second side of spreader beam 120 (FIG. 2).

First synchronizing linkage 401 can connect to upper arm 200 on upper connection appendage 240 via bearing 412. In an aspect, bearing 412 can be a spherical bearing. First synchronizing linkage 401 can connect to lower arm 300 on lower connection appendage 340 via bearing 410. In an aspect, bearing 410 can be a spherical bearing. Second synchronizing linkage 402 can connect to upper arm 200 on upper connection appendage 240 via bearing 422. In an aspect, bearing 422 can be a spherical bearing. Second synchronizing linkage 402 can connect to lower arm 300 on lower connection appendage 340 via bearing 420. In an aspect, bearing 420 can be a spherical bearing.

In another aspect, synchronizing linkage 400 can include one or more beams, one or more gears, one or more cable systems, one or more double rod pistons, one or more clutches, a ratchet and pawl, a chain and binder, one or more wedges, and/or one or more articulating arms.

Tank car lifting apparatus 100 can include a lifting position, for example as shown in FIGS. 1-2, where upper arm 200 and lower arm 300 extend vertically downward from spreader beam 120. Tank car lifting apparatus 100 can also include a storage position for transport of tank car lifting apparatus 100, for example as shown in FIGS. 10-11, where upper arm 200 and lower arm 300 are folded and extend generally horizontally with respect to spreader beam 120.

Upper arm 200 and lower arm 300 can be folded with respect to spreader beam 120. As shown in FIGS. 10-11, upper arm 200 can rotate about upper connection 220 such that lower bearing 210 at the lower end of upper arm 200 moves towards spreader beam 120. Lower arm 300 can rotate about lower connection 320 such that lower bearing 310 at the lower end of lower arm 300 moves towards spreader beam 120. Lower arm 300 can include a pin lock 304 to lock and hold upper arm 200 and lower arm 300 in a folded, storage configuration. For example, when upper arm 200 and lower arm 300 are folded, a pin can extend through pin lock 304 and can abut an upper surface of spreader beam 120 to prevent movement of upper arm 200 and lower arm 300 from the folded, storage configuration.

Tank car lifting apparatus 100 can include an integrated storage rack 440. For example, when upper arm 200 and lower arm 300 are folded into the storage configuration, integrated storage rack 440 can support tank car lifting apparatus 100 for storage and/or transport. Integrated storage rack 440 can eliminate the need to transport a rack in order to set tank car lifting apparatus 100 down in a remote location.

Figure 10:
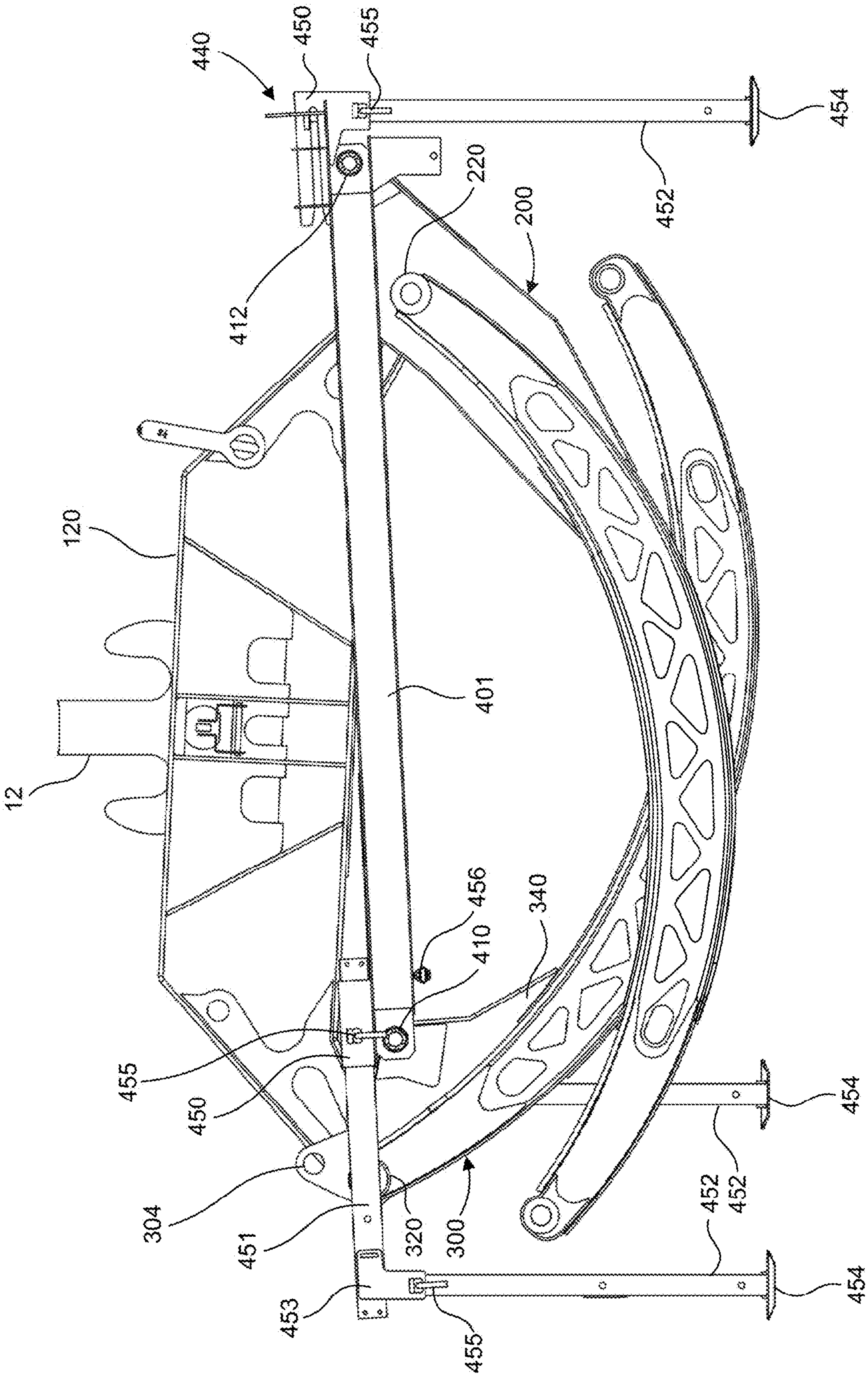
FIG. 10 is a front view of a tank car lifting apparatus in a storage configuration according to various aspects of the invention.
Figure 11:
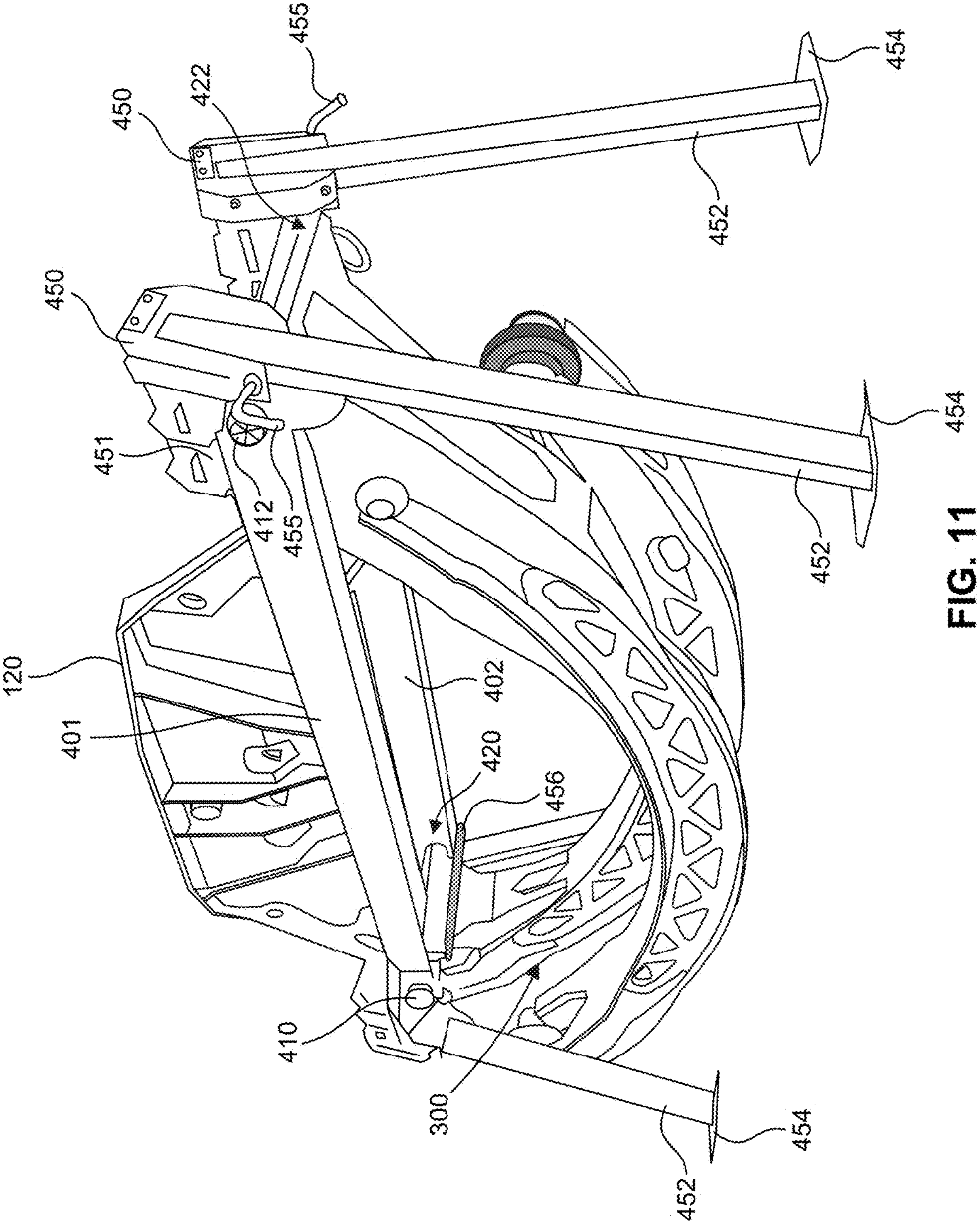
FIG. 11 is a perspective view of a tank car lifting apparatus and a storage configuration according to various aspects of the invention.

Storage rack 440 can include horizontal leg portions 451, vertical leg portions 452, and feet 454 (FIGS. 10-11). In an aspect, storage rack 440 can include four horizontal leg portions 451, four vertical leg portions 452, and four feet 454. In another aspect, storage rack 440 can include two horizontal leg portions 451 positioned on the side of tank car lifting apparatus 100 adjacent lower connection 320 where lower arm 300 connects to spreader beam 120. In a further aspect, storage rack 440 can include four vertical leg portions 452 without horizontal leg portions 451.

Leg brackets 450 can attach the horizontal leg portions 451 and/or the vertical leg portions 452 to tank car lifting apparatus 100. In an aspect, leg brackets 450 can be positioned on synchronizing linkage 400. For example, one or more leg brackets 450 can be positioned on synchronizing linkage 400 adjacent the bearing connecting the synchronizing linkage 400 to the upper arm 200 and adjacent the bearing connecting the synchronizing linkage 400 to the lower arm 300.

In an aspect, a first leg bracket 450 can be positioned on first synchronizing linkage 401 adjacent bearing 410, a second leg bracket 450 can be positioned on first synchronizing linkage 401 adjacent bearing 412, a third leg bracket 450 can be positioned on second synchronizing linkage 402 adjacent bearing 420, and a fourth leg bracket 450 can be positioned on second synchronizing linkage 402 adjacent bearing 422. In another aspect, first leg bracket 450 and third leg bracket 450 can attach a first horizontal leg portion 451 to the first synchronizing linkage 401 and a second horizontal leg portion 451 to the second synchronizing linkage 402. In this aspect, a first leg bracket 453 can attach a first vertical leg portion 452 to the first horizontal leg portion 451 and a second leg bracket 453 can attach a second vertical leg portion 452 to the second horizontal leg portion 451. The horizontal leg portions 451 allow storage rack 440 to extend outward from tank car lifting apparatus 100 for added stability.

Vertical leg portions 452 and/or horizontal leg portions 451 can translate through leg brackets 450 between a stowed position where vertical leg portions 451 are generally parallel to the synchronizing linkage 400 (FIGS. 1-2) and a deployed position where horizontal leg portions 451 are general perpendicular to synchronizing linkage 400 (FIGS. 3-4). Leg pins 455 can retain the Vertical leg portions 452 and/or horizontal leg portions 451 in the respective positions. In another aspect, turnbuckle 456 can be adjusted to keep the vertical leg portions 452 perpendicular to the ground and parallel to each other.

Figure 13:
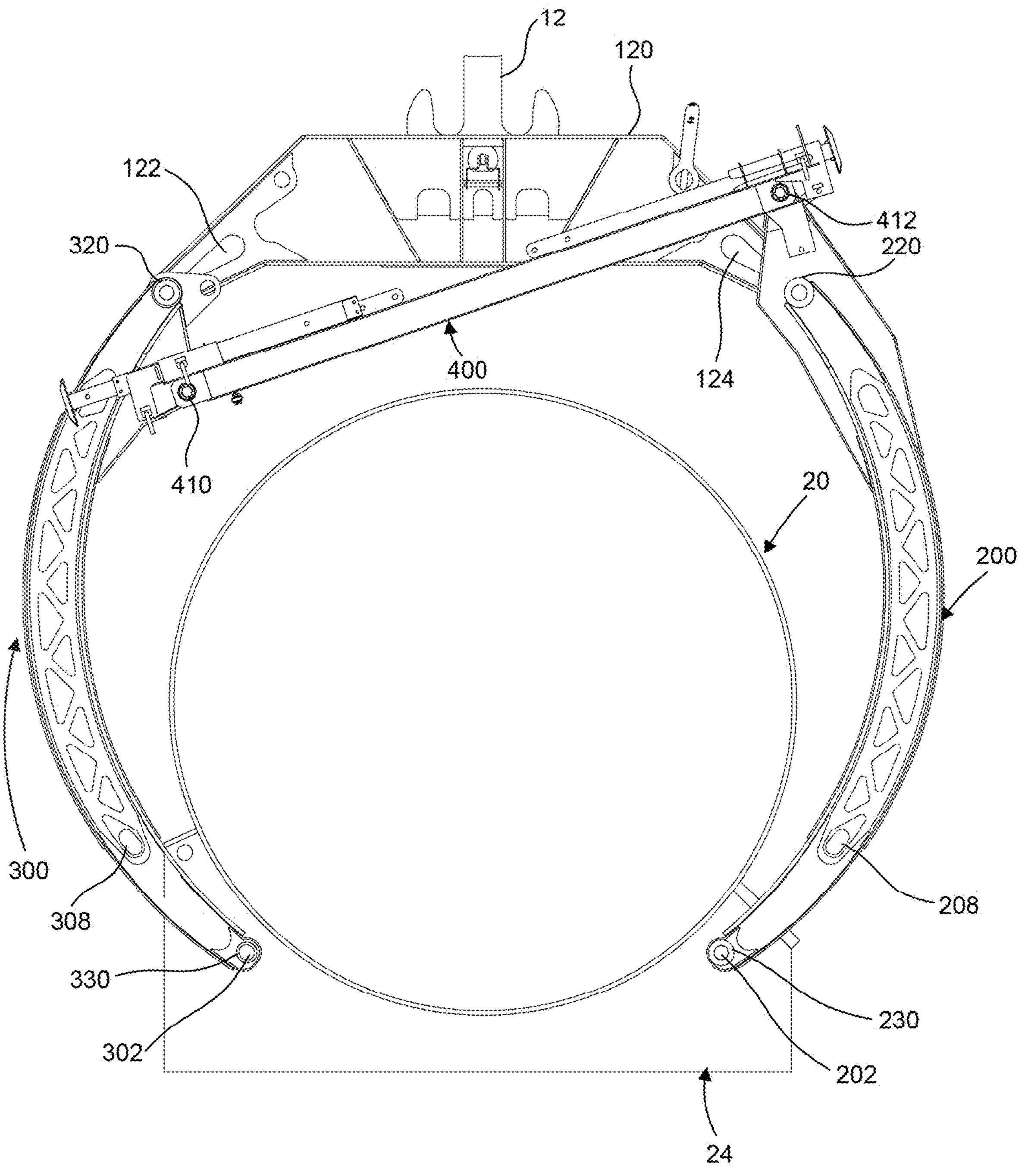
FIG. 13 is a front view of a tank car lifting apparatus and tank car according to various aspects of the invention.

A method of lifting a tank car is shown in FIGS. 12-13. A crane 10 (FIG. 3) can be positioned adjacent tank car 20. Tank car lifting apparatus 100 can be connected to crane hook 12 and can be suspended above tank car 20. Winch lines 16 can be connected to winch holes 208 and 308 and can pull upper arm 200 and lower arm 300 outward to place tank car lifting apparatus 100 in an open configuration. Synchronizing linkage 400 synchronies the movement of upper arm 200 and lower arm 300 such that upper arm 200 and lower arm 300 move at the same time as the winches retract winch lines 16 and pull the arms open.

Tank car lifting apparatus 100 can be lowered such that upper arm 200 and lower arm 300 surround tank car jacket 22. Synchronizing linkage 400 synchronizes the movement of upper arm 200 and lower arm 300 such that upper arm 200 and lower arm 300 move at the same time as the winches extend winch lines 16 and allow the arms to close. As the arms close, lower bearing 210 can be positioned adjacent a tank car lug 26 on tank car bolster 24. Lower bearing 310 can be positioned adjacent another tank car lug 26 on tank car bolster 24. Lower bearing 210 can be connected to the respective tank car lug 26 by pin 202 to form lower connection 230 with tank car bolster 24. Lower bearing 310 can be connected to the respective tank car lug 26 by a pin 302 to form lower connection 330 with tank car bolster 24. Crane 10 can raise tank car lifting apparatus 100 attached to tank car 20 to lift the tank car.

In another aspect, the method of lifting a tank car can include attaching a first crane to a crane shackle 14 and a second crane to shackle hole 121.

Figure 14A:
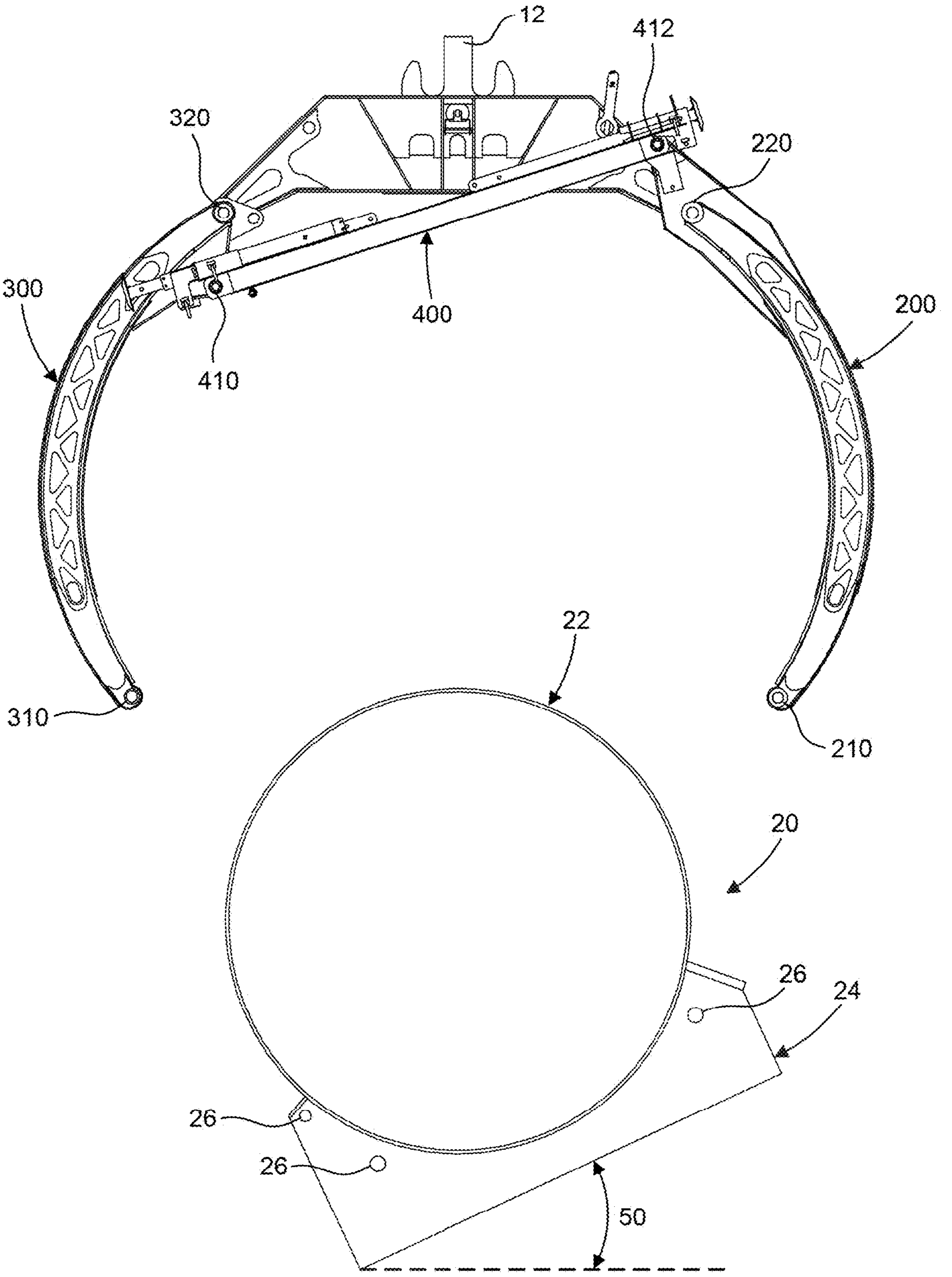
FIGS. 14A-14C show front views of a tank car lifting apparatus and inclined tank car according to various aspects of the invention
Figure 14B:
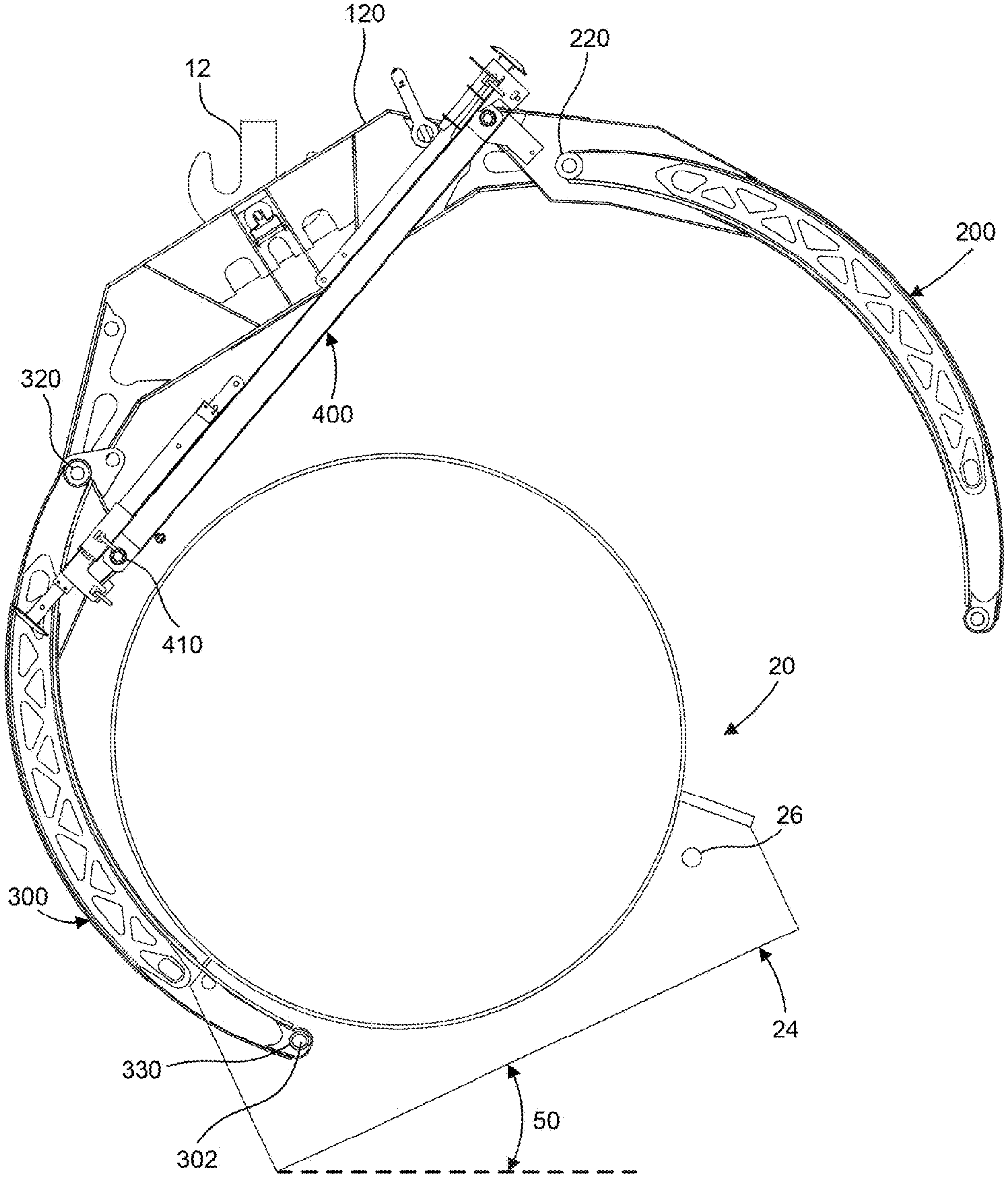
Figure 14C:
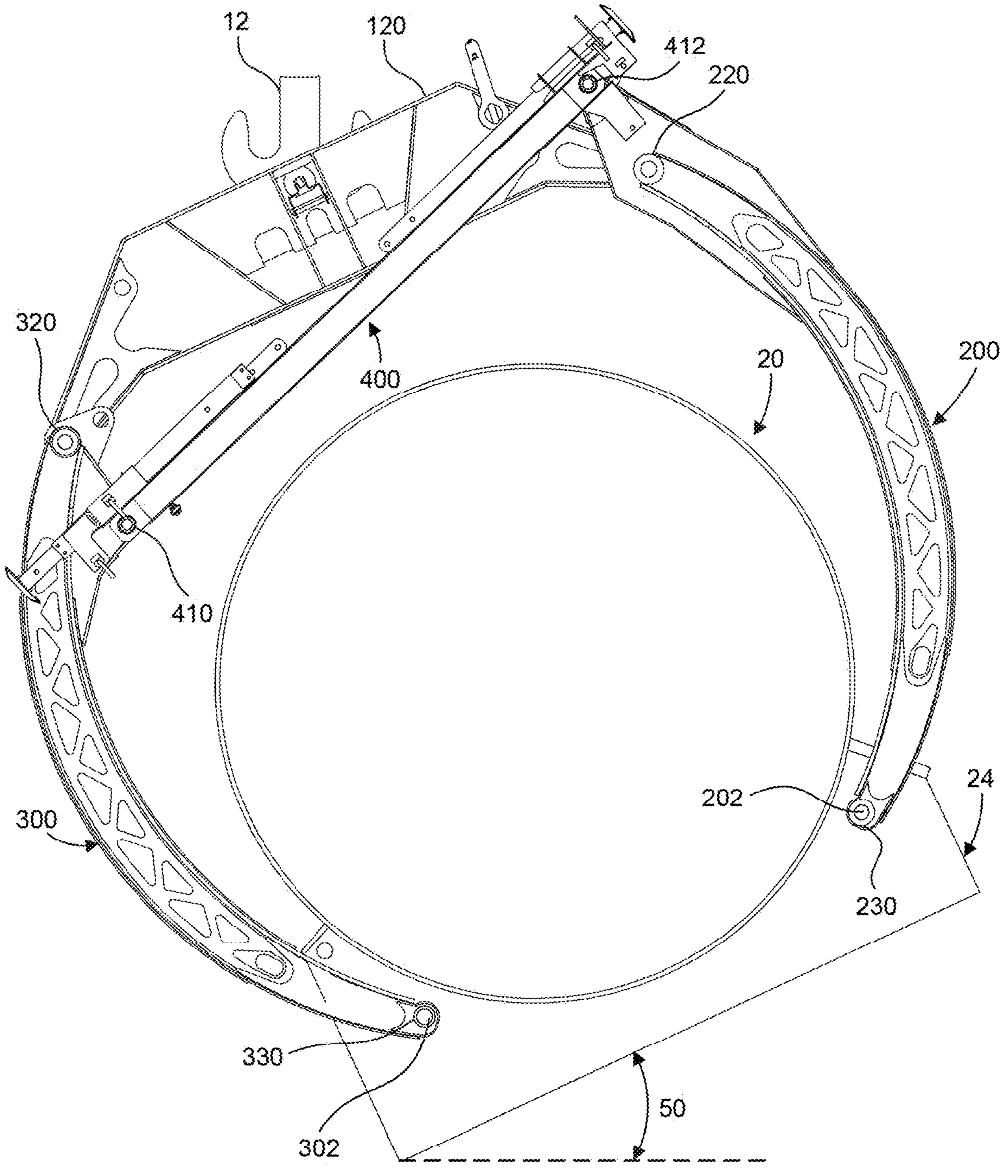
Figure 15:
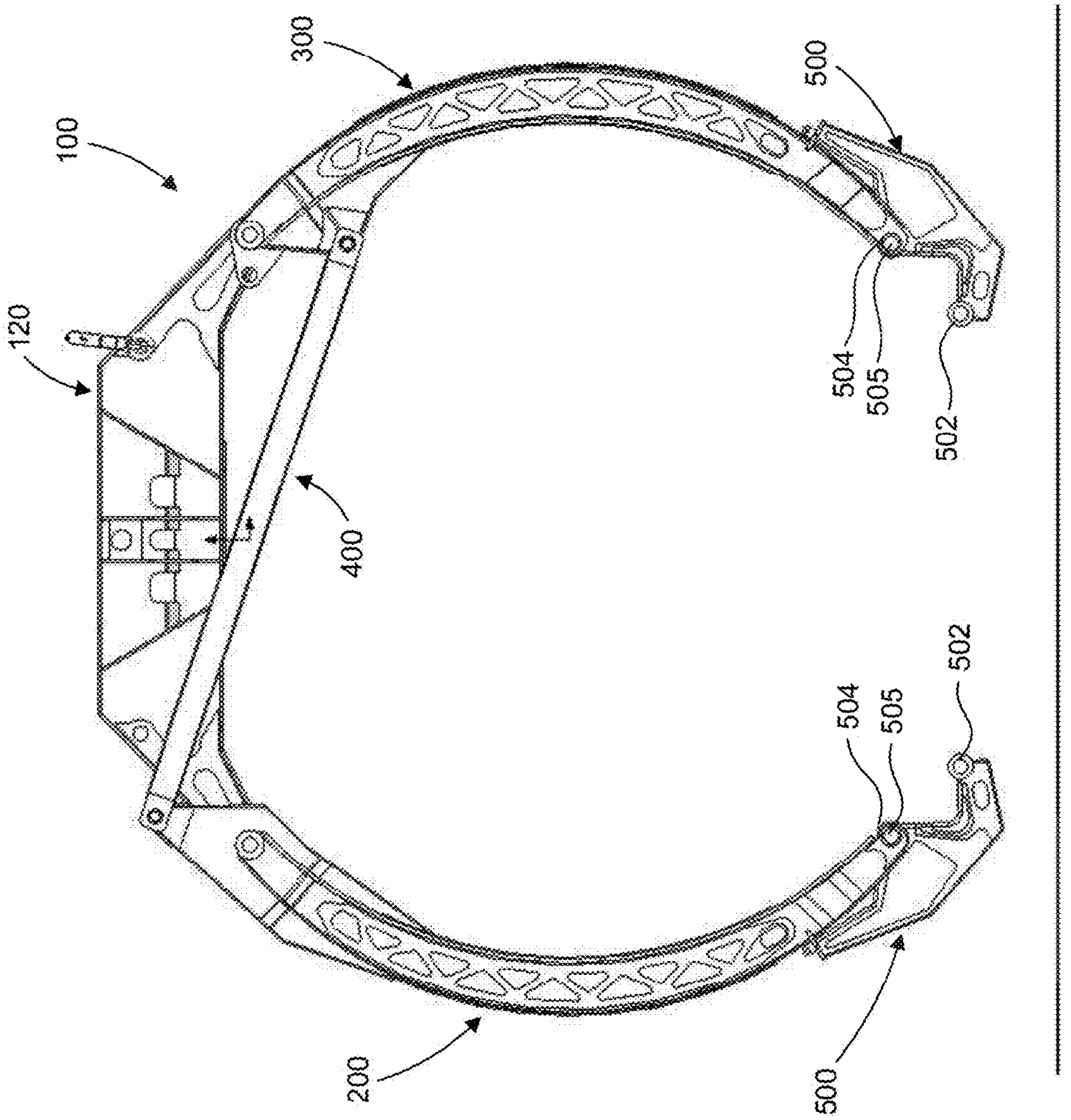
FIG. 15 is a front view of a tank car lifting apparatus with arm attachments according to various aspects of the invention.

In another aspect, a method of lifting a tank car positioned at an angle is shown in FIGS. 14A-14C. In this aspect, tank car bolster 24 can be positioned at an angle 50 with respect to the horizon. In an aspect, angle 50 can be approximately 25 degrees. Angle 50 can be greater than 25 degrees. In a further aspect, angle 50 can range from approximately zero to approximately 25 degrees, such as from approximately 5 degrees to approximately 25 degrees, such as from approximately 10 degrees to approximately 25 degrees, such as from approximately 15 degrees to approximately 25 degrees.

A crane can be positioned adjacent tank car 20. Tank car lifting apparatus 100 can be connected to crane hook 12 and can be suspended above tank car 20. Winch lines can be connected to winch holes 208 and 308 and can pull upper arm 200 and lower arm 300 outward to place tank car lifting apparatus 100 in an open configuration. Synchronizing linkage 400 synchronizes movement between upper arm 200 and lower arm 300 such that upper arm 200 and lower arm 300 move at the same time as the winches retract winch lines 16 and pull the arms open.

Tank car lifting apparatus 100 can be lowered such that upper arm 200 and lower arm 300 surround tank car jacket 22. Upper arm 200 can be positioned on the high side of tank car bolster 24 and lower arm 300 can be positioned on the low side of tank car bolster 24. Spreader beam 120 can rotate to permit lower arm 300 and lower bearing 310 to be positioned adjacent a tank car lug 26 on the low side of tank car bolster 24. Synchronizing linkage 400 synchronizes the movement of upper arm 200 and lower arm 300 such that upper arm 200 and lower arm 300 move at the same time as the winches extend winch lines 16 and allow the arms to close. As the arms close, lower bearing 310 can be connected to the respective tank car lug 26 by a pin 302 to form lower connection 330 with tank car bolster 24 (FIG. 14B). After lower bearing 310 is connected to tank car bolster 24, lower bearing 210 can be positioned adjacent a tank car lug 26 on tank car bolster 24. Lower bearing 210 can be connected to the respective tank car lug 26 by pin 202 to form lower connection 230 with tank car bolster 24 (FIG. 14C). The crane can raise tank car lifting apparatus 100 attached to tank car 20 to lift the tank car positioned at angle 50.

A method of folding upper arm 200 and lower arm 300 of tank car lifting apparatus 100 can include lowering tank car lifting apparatus 100 such that the lower ends of upper arm 200 and lower arm 300 contact the ground. The method can include further lowering tank car lifting apparatus 100 such that the ends of upper arm 200 and lower arm 300 adjacent the respective lower bearings 210 and 310 move upward toward spreader beam 120. In an aspect, upper arm 200 and lower arm 300 are folded by spiraling upper arm 200 and lower arm 300 with respect to spreader beam 120. Once upper arm 200 and lower arm 300 are generally parallel to spreader beam 120, lower arm 300 can be pinned to spreader beam 120 at pin lock 304 to prevent movement of lower arm 300.

Referring now to FIGS. 15-18, tank car lifting apparatus 100 can include lifting appendages 500. Lifting appendages 500 can make the tank car lifting apparatus universal in its application to attach to tank car lifting apparatus 100 and not limited to any particular type of tank car lift lug design. Lifting appendages 500 permit tank car lifting apparatus 100 to react against a common lift point available on any railcar without damaging the tank car jacket, provided that the tank car it is at an angle that is not too extreme relative to the horizon. This lift point is a jack pad 25 on a bottom portion of tank car bolster 24 that is commonly used to lift tank cars by a pair of jacks for the purpose of servicing the car.

Lifting appendages 500 can increase versatility of tank car lifting apparatus 100, but can decrease the amount of positive connection between the tank car lifting apparatus 100 and tank car 20. For example, when tank car lifting apparatus 100 is attached directly to the tank car, the connection is more robust and capable of dealing with more extreme service recovery operations, e.g., derailment. Lifting appendages 500 permit work in situations where tank car damage is a strong consideration, but the lifting and recovery process is less intense. Lifting appendages 500 have the ability to be connected to upper arm 200 and lower arm 300 of tank car lifting apparatus 100 for deployment against the jack pads 25 on the tank cars. In this configuration, the lifting appendages 500 and tank car lifting apparatus 100 can be secured to tank car 20 via turnbuckle type binders and clamp assemblies to ensure the lifting appendages 500 stay effectively positioned and connected to jack pad 25 on the tank car.

Lifting appendage 500 can include a bottom cylinder 502 that can be positioned adjacent jack pad 25 to lift tank car 20. Bottom cylinder 502 can be the only portion of lifting appendage 500 that contacts tank car bolster 24. In an aspect, bottom cylinder 502 can have a wall thickness. Lower portion 520 can be positioned adjacent bottom cylinder 502 to extend below jack pad 25.

Lifting appendage 500 can be connected to lower bearing 210 through connection bearing 504. In an aspect, connection bearing 504 can be a bushing. For example, a pin 505 can extend through lower bearing 210 and connection bearing 504 to connect lifting appendage 500 to upper arm 200. In another aspect, lifting appendage 500 can be connected to lower bearing 310 through connection bearing 504. For example, a pin 505 can extend through lower bearing 310 and connection bearing 504 to connect lifting appendage 500 to lower arm 300.

Lifting appendage 500 can include a bracket 510 to maintain the position of the lifting appendage on upper arm 200 and/or lower arm 300. For example, bracket 510 can include leg guides 512 and 514 that extend along the sides of upper arm 200 and/or lower arm 300. The outer surface of upper arm 200 and/or lower arm 300 can be positioned adjacent leg rest 516.

FIG. 18 shows a perspective view of lifting appendage 500 to demonstrate the surface van Mises stress (ksi), as predicted with 3D modeling. As shown, lifting appendage 500 can include a failure region 550. Failure region 550 can have a yield strength of approximately 30 ksi to 35 ksi, for example 31.994 ksi.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance. The breadth and scope of the present invention(s) should not be limited by any of the above-described exemplary embodiments, but should be defined only in accordance with the following claims and their equivalents.

What is claimed is:

1. A lifting apparatus for lifting a tank car comprising:

a first arm having a fixed shape to surround and not contact a tank car jacket, the first arm having a first connecting end opposed to a first lifting end, the first lifting end coupling to a tank car jack pad; and a second arm having a fixed shape to surround and not contact the tank car jacket, the second arm having a second connecting end opposed to a second lifting end, the second lifting end coupling to the tank car jack pad.

2. The lifting apparatus of claim 1, further comprising a first pin to couple the first lifting end to the tank car jack pad.

3. The lifting apparatus of claim 2, further comprising a second pin to couple the second lifting end to the tank car jack pad.

4. The lifting apparatus of claim 2, further comprising a beam coupled to the first connecting end.

5. The lifting apparatus of claim 4, wherein the beam is coupled to the second connecting end.

6. The lifting apparatus of claim 1, wherein the first lifting end contacts a bottom surface of the tank car jack pad.

7. The lifting apparatus of claim 6, further comprising a lower portion configured to extend from the first lifting end of the first arm to a bottom cylinder to contact the bottom surface of the tank car jack pad.

8. The lifting apparatus of claim 1, further comprising a first lifting appendage connected to the first lifting end configured to lift the tank car jack pad.

9. The lifting apparatus of claim 8, further comprising a second lifting appendage connected to the second lifting end configured to lift the tank car jack pad.

10. The lifting apparatus of claim 1, further comprising a first clamp assembly coupled to the first lifting end and configured to be coupled to the tank car jack pad.

11. The lifting apparatus of claim 10, further comprising a second clamp assembly coupled to the second lifting end and configured to be coupled to the tank car jack pad.

12. A lifting apparatus for lifting a tank car comprising:

a first arm having a fixed shape to surround and not contact a tank car jacket, the first arm having a first connecting end and a first lifting end, the first lifting end coupling to a tank car jack pad.

13. The lifting apparatus of claim 12, further comprising a second arm having a fixed shape to surround and not contact the tank car jacket, the second arm having a second connecting end opposed to a second lifting end, the second lifting end coupling to the tank car jack pad.

14. The lifting apparatus of claim 12, further comprising a pin to couple the first lifting end to the tank car jacket.

15. The lifting apparatus of claim 12, wherein the first lifting end contacts a bottom surface of the tank car jack pad.

16. The lifting apparatus of claim 12, further comprising a clamp assembly coupled to the first lifting end and configured to be coupled to the tank car jack pad.

17. The lifting apparatus of claim 12, further comprising a lifting appendage connected to the first lifting end configured to lift the tank car jack pad.

18. A method for lifting a tank car comprising:

positioning a first arm having a fixed shape to surround and not contact a tank car jacket around the tank car jacket, the first arm having a first connecting end opposed to a first lifting end, and positioning a second arm having a fixed shape to surround and not contact the tank car jacket around the tank car jacket, the second arm having a second connecting end opposed to a second lifting end.

19. The method of claim 18 further comprising:

coupling the first connecting end to the tank car jack pad, and coupling the second connecting end to the tank car jack pad.

20. The method of claim 18, wherein the coupling the first connecting end to the tank car jack pad includes pinning the first connecting end to the tank car jack pad.

* * * * *